(12) United States Patent
Siew et al.

(10) Patent No.: US 12,539,385 B2
(45) Date of Patent: Feb. 3, 2026

(54) MEDICAL TUBE

(71) Applicant: Fisher & Paykel Healthcare Limited, Auckland (NZ)

(72) Inventors: Silas Sao Jin Siew, Auckland (NZ); Eric Lenard Doel, Auckland (NZ); Christopher Jaye Norman Amadio, Auckland (NZ); Christopher Gareth Sims, Auckland (NZ)

(73) Assignee: Fisher & Paykel Healthcare Limited, Auckland (NZ)

( * ) Notice: Subject to any disclaimer, the term of this patent is extended or adjusted under 35 U.S.C. 154(b) by 988 days.

(21) Appl. No.: 17/762,336

(22) PCT Filed: Sep. 23, 2020

(86) PCT No.: PCT/NZ2020/050108
§ 371 (c)(1),
(2) Date: Mar. 21, 2022

(87) PCT Pub. No.: WO2021/060992
PCT Pub. Date: Apr. 1, 2021

(65) Prior Publication Data
US 2022/0331543 A1    Oct. 20, 2022

Related U.S. Application Data

(60) Provisional application No. 62/904,489, filed on Sep. 23, 2019.

(51) Int. Cl.
*A61M 16/08* (2006.01)
*A61M 16/10* (2006.01)
*A61M 16/16* (2006.01)

(52) U.S. Cl.
CPC .... *A61M 16/0875* (2013.01); *A61M 16/0816* (2013.01); *A61M 16/1075* (2013.01); *A61M 16/16* (2013.01); *A61M 2202/02* (2013.01)

(58) Field of Classification Search
CPC .......... A61M 16/0875; A61M 16/0816; A61M 16/1075; A61M 16/16; A61M 2202/02;
(Continued)

(56) References Cited

U.S. PATENT DOCUMENTS 2,949,133 A * 8/1960 Rothermel ............. B29D 23/18
428/371
5,848,223 A  12/1998 Carlson
(Continued)

FOREIGN PATENT DOCUMENTS

CH     279416         11/1951
DE     1902796 A1 *   1/1969
(Continued)

*Primary Examiner* — Victoria Murphy
*Assistant Examiner* — Tina Zhang
(74) *Attorney, Agent, or Firm* — VIA LLP

(57)  ABSTRACT

A medical tube comprises a spirally wound bead forming a plurality of successive coils. Each of the plurality of successive coils has an internal diameter and an external diameter, and a spirally wound film extending between adjacent coils of the bead. The film is bonded at a first location on a surface of a first coil of the bead and at a second location on a surface of a second coil of the bead. The first coil is adjacent to the second coil and the first location and the second location are located between the internal diameters and external diameters of respective first and second adjacent coils. Together the spirally wound bead and spirally wound film form a conduit.

33 Claims, 25 Drawing Sheets

(58) Field of Classification Search
CPC ...... A61M 16/0069; A61M 2205/0216; A61M 2205/505; A61M 2207/00; A61M 16/0825; A61M 16/1095; A61M 16/08; A61M 16/0666; A61M 16/0833; A61M 2016/0039; A61M 2206/10; F16L 11/115; F16L 11/24; F16L 37/084; F16L 11/112; F16L 9/06; F16L 9/00; F16L 57/00; B29C 53/582; B29C 53/785
USPC ........................ 138/122, 129, 177, 118, 154; 128/204.17, 204.18, 911; 156/143
See application file for complete search history.

(56) References Cited

U.S. PATENT DOCUMENTS

| | | | |
|---|---|---|---|
| 7,291,240 B2 * | 11/2007 | Smith | B29C 66/83415 |
| | | | 156/173 |
| 8,783,298 B2 | 7/2014 | Zucker | |
| 9,468,733 B2 * | 10/2016 | Graham | A61M 16/0875 |
| 2003/0098084 A1 * | 5/2003 | Ragner | A47L 9/24 |
| | | | 138/122 |
| 2004/0081784 A1 | 4/2004 | Smith | |
| 2005/0150505 A1 * | 7/2005 | Burrow | A61M 16/0875 |
| | | | 128/911 |
| 2007/0163588 A1 * | 7/2007 | Hebrank | A61M 16/0069 |
| | | | 128/205.29 |
| 2009/0025724 A1 | 1/2009 | Herron, Jr. | |
| 2009/0277525 A1 | 11/2009 | Jourdan | |
| 2010/0224276 A1 | 9/2010 | Forrester et al. | |
| 2013/0092277 A1 | 4/2013 | Garrett et al. | |
| 2014/0000626 A1 | 1/2014 | O'Connor et al. | |
| 2014/0130931 A1 | 5/2014 | Forrester | |
| 2015/0027204 A1 * | 1/2015 | Stoks | G01K 1/14 |
| | | | 73/31.05 |
| 2016/0296720 A1 | 10/2016 | Henry et al. | |
| 2017/0304578 A1 | 10/2017 | Stoks et al. | |
| 2018/0021535 A1 * | 1/2018 | Goff | A61M 16/0875 |
| | | | 128/202.27 |
| 2018/0028768 A1 | 2/2018 | Boyes | |
| 2018/0214660 A1 | 8/2018 | Stoks | |
| 2019/0224439 A1 * | 7/2019 | Lopez Muedano | A61L 29/14 |

FOREIGN PATENT DOCUMENTS

| | | |
|---|---|---|
| DE | 1902796 | 8/1970 |
| WO | WO 2004/024429 | 3/2004 |
| WO | 2018116187 | 6/2018 |
| WO | 2018217105 A1 | 11/2018 |
| WO | 2019164409 A1 | 8/2019 |

* cited by examiner

MEDICAL TUBE

FIELD OF THE INVENTION

The present disclosure generally relates to tubes configured for use in medical systems. More particularly, the present disclosure relates to medical tubes configured to connect patient interfaces to respiratory assistance systems.

BACKGROUND

Medical tubes are used in respiratory systems to convey respiratory gases between a respiratory component, such as a ventilator, positive airway pressure device (PAP), or humidifier, and a patient interface. Respiratory gases can be heated and/or humidified prior to delivery to the patient to mimic the transformation of air that occurs as it enters the respiratory system.

Medical tubes can deliver the heated and/or humidified respiratory gases directly to a patient interface or, in some cases, an additional medical tube can be located between the medical tube and the patient interface.

Because the patient interface is tethered to the respiratory component by a medical tube, a number of forces can be transmitted to the patient interface via the medical tube while in use. These forces may be generated by the weight of the medical tube pulling on the patient interface, which is commonly known as tube drag, as well as any tension or torsion generated in the medical tube while in use.

The forces transmitted to the patient interface can be disadvantageous as they often disrupt the seal formed between a patient interface and the users face and/or the positioning of the patient interface on the user. This may result in additional tension being needed in the headgear to overcome these forces and maintain a seal between the patient interface and the users face and/or the position of the patient interface on the users face. An effective seal is necessary to be able to deliver PAP respiratory treatment effectively.

Furthermore, the weight of the medical tube when resting on a user's body during respiratory treatment may lead to a sense of restricted movement and/or impinged comfort of the user. By producing a medical tube with a reduced mass per unit length, undesirable feelings of restricted movement, impinged comfort and/or tube drag due to the medical tube's weight may be beneficially reduced.

A medical tube of reduced mass may further be beneficial due to the reduced use of material resulting in a more cost-effective medical tube per unit length. This is particularly beneficial in hospital environments where the majority of medical tubes are disposed after single patient use and/or a set period of time.

It is desirable to provide a medical tube that for a given pitch, diameter, geometry of the bead, film thickness and film inward bias, has a reduced use of material and therefore a reduced mass per unit length.

Alternatively, or additionally, it is desirable to provide a medical tube that for a given: pitch, diameter, geometry of the bead, film thickness and film inward bias, has a reduced use of material and therefore a reduced cost of material per unit length.

SUMMARY OF INVENTION

Various embodiments of the present disclosure will now be described by way of the following embodiments. However, it will also be appreciated that the features described herein can be combined in other embodiments.

A medical tube comprises a conduit, the conduit formed from a spirally wound bead and a spirally wound film, wherein the spirally wound bead forms a plurality of successive coils, each of the plurality of successive coils having an internal diameter and an external diameter; and the spirally wound film extends between adjacent coils of the bead wherein the film is bonded at a first location on a surface of a first coil of the bead and at a second location on a surface of a second coil of the bead, wherein the first coil is adjacent to the second coil, wherein the first location and the second location are located between the internal diameters and external diameters on opposed sides of respective first and second adjacent coils such that the spirally wound film extending between the first and second coils of the bead does not overlap any sections of the spirally wound film extending between further adjacent coils of the bead.

Each of the plurality of successive coils preferably have a substantially uniform internal diameter and a substantially uniform external diameter when the medical tube is at rest. The spirally wound film is preferably inwardly biased between the first and second coils of the bead.

The spirally wound bead preferably comprises a thermoplastic polyurethane or a thermoplastic elastomer.

The spirally wound film preferably comprises a thermoplastic polyurethane or a thermoplastic elastomer.

A length of the conduit may be between about 100 mm to 1000 mm, preferably approximately 300 mm.

The plurality of successive coils comprises a pitch, and the pitch is preferably between about 1.5 mm to 3.5 mm when the medical tube is at rest.

The conduit has a minimum internal diameter preferably between about 10 mm to 16.8 mm when the medical tube is at rest.

The plurality of successive coils have an internal diameter preferably between about 10 mm to 17 mm when the medical tube is at rest.

The plurality of successive coils have an external diameter preferably between about 11 mm to 18 mm, or between about 16 mm to 20 mm.

The spirally wound bead preferably has a cross-sectional shape that is substantially D-shaped.

The spirally wound bead preferably has a cross-sectional shape that is substantially elliptical, and more preferably comprises a flattened elliptical shape.

The spirally wound bead preferably has a cross-sectional width of approximately 1 mm in a direction parallel to a longitudinal axis of the medical tube and/or a cross-sectional height of approximately 1 mm in a direction perpendicular to the longitudinal axis of the medical tube.

The spirally wound film has a thickness of preferably about 0.05 mm to 1 mm.

The conduit preferably has a ratio of thickness of the spirally wound bead to the spirally wound film of about 1:0.05 to about 1:1.

The medical tube has a resistance to flow of preferably less than or equal to 1.5 mm/H2O when in a straightened non-extended position at 30 L/Min.

The plurality of successive coils have a coil angle preferably between about 3 degrees and 6 degrees.

The conduit has a strength in tension preferably greater than 40 N when extended at 60 mm/min, and more preferably at least 120 N.

The conduit can preferably elongate from 100% of its resting length up to at least 210% of its resting length without substantial plastic deformation occurring.

The conduit preferably has a weight between about 20 grams per meter and 100 grams per meter.

The first and/or second locations preferably comprise a portion of the bead adjacent the external diameter of the bead.

Opposing edges of adjacent windings of the film are preferably disposed on the bead substantially adjacent each other and/or in a substantially facing relationship.

The first location and the second location may be symmetric or asymmetric.

The film, in cross-section, preferably forms a substantially sinusoidal shape about the bead. The film, in cross-section, preferably forms an angle of between about 45 degrees and about 135 degrees, more preferably between about 80 degrees and about 100 degrees, and most preferably about 90 degrees, at a point of inflection.

The film, in cross-section, may alternatively form an Omega (Ω)-shape about each of the coils. The film, in cross-section, preferably forms an angle of between about 170 degrees and about 190 degrees, and more preferably an angle of about 180 degrees, at a point of inflection. The first location and/or the second location, in cross-section, preferably extend inwardly beyond a parallel axis and/or a widest point of the bead.

The medical tube preferably further comprises a first connector at a first end configured for connection with a patient interface, and a second connector at a second end configured for connection with a respiratory device.

A medical tube comprising: a conduit formed from an elongate bead spirally wound with an elongate film, the elongate bead bonded with the elongate film, wherein the elongate bead and the elongate film are wound in an alternating arrangement such that the elongate film of a first winding is separated from the elongate film of a second winding by the elongate bead.

Each of the windings of the spirally wound elongate bead preferably has a substantially uniform internal diameter and a substantially uniform external diameter when the medical tube is at rest.

The elongate bead preferably comprises a thermoplastic polyurethane or a thermoplastic elastomer.

The elongate film preferably comprises a thermoplastic polyurethane or a thermoplastic elastomer.

A length of the conduit is preferably between about 100 mm to 1000 mm, and more preferably is approximately 300 mm.

The spirally wound elongate bead comprises a pitch, and the pitch is preferably between about 1.5 mm to 3.5 mm when the medical tube is at rest.

The conduit has a minimum internal diameter preferably between about 10 mm to 16.8 mm when the medical tube is at rest.

The spirally wound elongate bead has an internal diameter preferably between about 10 mm to 17 mm when the medical tube is at rest.

The spirally wound elongate bead has an external diameter preferably between about 11 mm to 18 mm.

The spirally wound elongate bead has an external diameter preferably between about 16 mm to 20 mm.

The spirally wound elongate bead has a cross-sectional shape that is preferably substantially D-shaped.

The spirally wound elongate bead may alternatively have a cross-sectional shape that is substantially elliptical, and preferably comprises a flattened elliptical shape.

The spirally wound elongate bead preferably has a cross-sectional width of approximately 1 mm in a direction parallel to a longitudinal axis of the medical tube and/or a cross-sectional height of approximately 1 mm in a direction perpendicular to the longitudinal axis of the medical tube.

The elongate film has a thickness preferably of about 0.05 mm to 1 mm.

The conduit preferably has a ratio of thickness of the spirally wound elongate bead to the elongate film of about 1:0.05 to about 1:1.

The medical tube has a resistance to flow of preferably less than or equal to 1.5 mm/H2O when in a straightened non-extended position at 30 L/Min.

The spirally wound elongate bead has a coil angle preferably between about 3 degrees and 6 degrees.

The conduit has a strength in tension preferably greater than 40 N when extended at 60 mm/min, and more preferably at least 120 N.

The conduit can preferably elongate from 100% of its resting length up to at least 210% of its resting length without substantial plastic deformation occurring.

The conduit has a weight preferably between about 20 grams per meter and 100 grams per meter.

The film, in cross-section, preferably extends to a position at or adjacent an outer apex of the bead.

Opposing edges of adjacent windings of the film may be disposed on the bead substantially adjacent each other and/or in a substantially facing relationship.

The film may be disposed asymmetrically with respect to the bead.

The film may extend beyond an outer apex of the bead.

The film, in cross-section, preferably forms a substantially sinusoidal shape about the bead. The film, in cross-section, preferably forms an angle of between about 170 degrees and about 190 degrees, and preferably an angle of about 180 degrees, at a point of inflection.

The film, in cross-section, may alternatively form an Omega-shape (Ω) about the bead.

The film, in cross-section, preferably forms an angle of between about 45 degrees and about 135 degrees, more preferably between about 80 degrees and about 100 degrees, and most preferably about 90 degrees, at a point of inflection. The first location and/or the second location, in cross-section, may extend inwardly beyond a parallel axis and/or a widest point of the bead.

The medical tube preferably further comprises a first connector at a first end configured for connection with a patient interface, and a second connector at a second end configured for connection with a respiratory device.

A medical tube comprising: a conduit formed from a spirally wound elongate bead and a film, the spirally wound elongate bead forming a plurality of successive coils, and the film bonded to the spirally wound elongate bead and extending between adjacent coils, wherein the conduit is formed by alternating coils and film portions without the film overlapping itself.

Each of the plurality of successive coils preferably has a substantially uniform internal diameter and a substantially uniform external diameter when the medical tube is at rest.

The film is preferably inwardly biased between a first coil and a second coil of the plurality of successive coils of the spirally wound elongate bead.

The spirally wound elongate bead preferably comprises a thermoplastic polyurethane or a thermoplastic elastomer.

The film preferably comprises a thermoplastic polyurethane or a thermoplastic elastomer.

A length of the conduit is preferably between about 100 mm to 1000 mm, and more preferably is approximately 300 mm.

The plurality of successive coils comprises a pitch, and the pitch is preferably between about 1.5 mm to 3.5 mm when the medical tube is at rest.

The conduit has a minimum internal diameter preferably between about 10 mm to 16.8 mm when the medical tube is at rest.

The plurality of successive coils have an internal diameter preferably between about 10 mm to 17 mm when the medical tube is at rest.

The plurality of successive coils have an external diameter preferably between about 11 mm to 18 mm.

The spirally wound elongate bead has an external diameter preferably between about 16 mm to 20 mm.

The spirally wound elongate bead has a cross-sectional shape that is preferably substantially D-shaped.

The spirally wound elongate bead may alternatively have a cross-sectional shape that is substantially elliptical, and preferably comprises a flattened elliptical shape.

The spirally wound elongate bead preferably has a cross-sectional width of approximately 1 mm in a direction parallel to a longitudinal axis of the medical tube and/or a cross-sectional height of approximately 1 mm in a direction perpendicular to the longitudinal axis of the medical tube.

The film has a thickness of preferably about 0.05 mm to 1 mm.

The conduit preferably has a ratio of thickness of the spirally wound elongate bead to the film of about 1:0.05 to about 1:1.

The medical tube has a resistance to flow of preferably less than or equal to 1.5 mm/H2O when in a straightened non-extended position at 30 L/Min.

The plurality of successive coils have a coil angle preferably between about 3 degrees and 6 degrees.

The conduit has a strength in tension preferably greater than 40 N when extended at 60 mm/min, and more preferably at least 120 N.

The conduit can preferably elongate from 100% of its resting length up to at least 210% of its resting length without substantial plastic deformation occurring.

The conduit has a weight preferably between about 20 grams per meter and 100 grams per meter.

The film, in cross-section, may extend to a position at or adjacent an outer apex of the bead.

Opposing edges of adjacent windings of the film may be disposed on the bead substantially adjacent each other and/or in a substantially facing relationship.

The film may be disposed asymmetrically with respect to the bead.

The film may extend beyond an outer apex of the bead.

The film, in cross-section, preferably forms a substantially sinusoidal shape about the bead. The film, in cross-section, preferably forms an angle of between about 170 degrees and about 190 degrees, and more preferably an angle of about 180 degrees, at a point of inflection.

The film, in cross-section, may alternatively form an Omega-shape (Ω) about the bead. The film, in cross-section, preferably forms an angle of between about 45 degrees and about 135 degrees, more preferably between about 80 degrees and about 100 degrees, and most preferably about 90 degrees, at a point of inflection. The film is preferably bonded to the bead inwardly beyond a parallel axis and/or a widest point of the bead.

The medical tube preferably further comprises a first connector at a first end configured for connection with a patient interface, and a second connector at a second end configured for connection with a respiratory device.

A medical tube comprising: a conduit comprising a spiral elongate bead and a film, the spiral elongate bead forming a plurality of coils, each of the plurality of coils having an inner surface facing radially inwards and an outer surface facing radially outwards, and the film extending between adjacent coils, the film bonded to adjacent coils such that at least a portion of the inner surface and outer surface of each of the plurality of coils are substantially exposed.

Each of the plurality of coils preferably has a substantially uniform internal diameter and/or a substantially uniform external diameter when the medical tube is at rest.

The film is preferably inwardly biased between adjacent coils of the bead.

The spiral elongate bead preferably comprises a thermoplastic polyurethane or a thermoplastic elastomer.

The film preferably comprises a thermoplastic polyurethane or a thermoplastic elastomer.

A length of the conduit is preferably between about 100 mm to 1000 mm, and more preferably is approximately 300 mm.

The plurality of coils comprises a pitch, and the pitch is preferably between about 1.5 mm to 3.5 mm when the medical tube is at rest.

The conduit has a minimum internal diameter between about 10 mm to 16.8 mm when the medical tube is at rest.

The plurality of coils have an internal diameter preferably between about 10 mm to 17 mm when the medical tube is at rest.

The plurality of coils have an external diameter preferably between about 11 mm to 18 mm. The spirally wound elongate bead has an external diameter preferably between about 16 mm to 20 mm.

The spiral elongate bead has a cross-sectional shape that is preferably substantially D-shaped.

The spiral elongate bead may alternatively have a cross-sectional shape that is substantially elliptical, and preferably comprises a flattened elliptical shape.

The spiral elongate bead preferably has a cross-sectional width of approximately 1 mm in a direction parallel to a longitudinal axis of the medical tube and a cross-sectional height of approximately 1 mm in a direction perpendicular to the longitudinal axis of the medical tube.

The film has a thickness of preferably about 0.05 mm to 1 mm.

The conduit preferably has a ratio of thickness of the spiral elongate bead to the film of about 1:0.05 to about 1:1.

The medical tube has a resistance to flow of preferably less than or equal to 1.5 mm/H2O when in a straightened non-extended position at 30 L/Min.

The plurality of coils have a coil angle preferably between about 3 degrees and 6 degrees.

The conduit has a strength in tension preferably greater than 40 N when extended at 60 mm/min, and more preferably at least 120 N.

The conduit can preferably elongate from 100% of its resting length up to at least 210% of its resting length without substantial plastic deformation occurring.

The conduit has a weight preferably between about 20 grams per meter and 100 grams per meter.

The film, in cross-section, preferably extends to a position at or adjacent an outer apex of the bead.

Opposing edges of adjacent windings of the film may be disposed on the bead substantially adjacent each other and/or in a substantially facing relationship.

The film may be disposed asymmetrically with respect to the bead.

The film may extend beyond an outer apex of the bead.

The film, in cross-section, preferably forms a substantially sinusoidal shape about the bead. The film, in cross-section, preferably forms an angle of between about 170 degrees and about 190 degrees, and more preferably an angle of about 180 degrees, at a point of inflection.

The film, in cross-section, may alternatively form an Omega-shape (Ω) about the bead. The film, in cross-section, preferably forms an angle of between about 45 degrees and about 135 degrees, more preferably between about 80 degrees and about 100 degrees, and most preferably about 90 degrees at a point of inflection. The film, in cross-section, is preferably bonded to the bead beyond a parallel axis and/or a widest point of the bead.

The medical tube preferably further comprises a first connector at a first end configured for connection with a patient interface, and a second connector at a second end configured for connection with a respiratory device.

A medical tube comprising: a spirally wound bead forming a plurality of successive coils, each of the plurality of successive coils having an internal diameter and an external diameter, and a spirally wound film extending between adjacent coils of the bead wherein the film is bonded at a first location on a surface of a first coil of the bead and at a second location on a surface of a second coil of the bead, wherein the first coil is adjacent the second coil, wherein the first location and second location are located between the internal diameters and external diameters of respective first and second adjacent coils, the spirally wound film extending between the first and second coils of the bead does not overlap the spirally wound film extending between further adjacent coils of the bead, and the spirally wound film is inwardly biased between the first and second coils of the bead, and together the spirally wound bead and spirally wound film form a conduit.

Each of the plurality of successive coils preferably has a substantially uniform internal diameter and/or a substantially uniform external diameter when the medical tube is at rest.

The spirally wound bead preferably comprises a thermoplastic polyurethane or a thermoplastic elastomer.

The spirally wound film preferably comprises a thermoplastic polyurethane or a thermoplastic elastomer.

A length of the conduit is preferably between about 100 mm to 1000 mm, and more preferably is approximately 300 mm.

The plurality of successive coils comprises a pitch, and the pitch is preferably between about 1.5 mm to 3.5 mm when the medical tube is at rest.

The conduit has a minimum internal diameter preferably between about 10 mm to 16.8 mm when the medical tube is at rest.

The plurality of successive coils have an internal diameter preferably between about 10 mm to 17 mm when the medical tube is at rest.

The plurality of successive coils have an external diameter preferably between about 11 mm to 18 mm.

The spirally wound elongate bead has an external diameter preferably between about 16 mm to 20 mm.

The spirally wound bead has a cross-sectional shape that is preferably substantially D-shaped.

The spirally wound bead may alternatively have a cross-sectional shape that is substantially elliptical, and preferably comprises a flattened elliptical shape.

The spirally wound bead preferably has a cross-sectional width of approximately 1 mm in a direction parallel to a longitudinal axis of the medical tube and/or a cross-sectional height of approximately 1 mm in a direction perpendicular to the longitudinal axis of the medical tube.

The spirally wound film has a thickness of preferably about 0.05 mm to 1 mm.

The conduit preferably has a ratio of thickness of the spirally wound bead to the spirally wound film of about 1:0.05 to about 1:1.

The medical tube has a resistance to flow of preferably less than or equal to 1.5 mm/H2O when in a straightened non-extended position at 30 L/Min.

The plurality of successive coils have a coil angle preferably between about 3 degrees and 6 degrees.

The conduit has a strength in tension preferably greater than 40 N when extended at 60 mm/min, and more preferably at least 120 N.

The conduit can preferably elongate from 100% of its resting length up to at least 210% of its resting length without substantial plastic deformation occurring.

The conduit has a weight preferably between about 20 grams per meter and 100 grams per meter.

The film, in cross-section, preferably extends to a position at or adjacent an outer apex of the bead.

Opposing edges of adjacent windings of the film may be disposed on the bead substantially adjacent each other and/or in a substantially facing relationship.

The film may be disposed asymmetrically with respect to the bead.

The film, in cross-section, preferably forms a substantially sinusoidal shape about the bead. The film, in cross-section, preferably forms an angle of between about 170 degrees and about 190 degrees, and more preferably an angle of about 180 degrees, at a point of inflection.

The film, in cross-section, may alternatively form an Omega-shape (Ω) about the bead. The film, in cross-section, preferably forms an angle of between about 45 degrees and about 135 degrees, more preferably between about 80 degrees and about 100 degrees, and most preferably about 90 degrees, at a point of inflection. The film is preferably bonded to the bead inwardly beyond a parallel axis and/or a widest point of the bead.

The medical tube preferably further comprises a first connector at a first end configured for connection with a patient interface, and a second connector at a second end configured for connection with a respiratory device.

A medical tube comprising a conduit, the conduit comprising: a spirally-wound bead; and a spirally-wound film; wherein the film is bonded to the bead such that opposing edges of adjacent windings of the film are disposed on the bead substantially adjacent each other in a substantially facing relationship.

The spirally wound bead preferably comprises a substantially uniform internal diameter and/or a substantially uniform external diameter along a length of the conduit.

The spirally wound film is preferably inwardly biased between adjacent coils of the bead.

The spirally-wound bead has a cross-sectional shape that is preferably substantially D-shaped.

The spirally-wound bead may alternatively have a cross-sectional shape that is substantially elliptical, and preferably comprises a flattened elliptical shape.

The opposing edges are preferably disposed at or adjacent an outer apex of the bead.

The opposing edges may alternatively be disposed eccentrically on the bead.

The opposing edges are preferably spaced from each other to expose an outer surface of the bead. The opposing edges may alternatively abut each other.

The film is preferably bonded to the bead radially inwardly beyond a parallel axis and/or a widest point of the bead.

The film, in cross-section, forms an angle of preferably between about 170 degrees and about 190 degrees, and more preferably an angle of about 180 degrees, at a point of inflection.

A medical tube comprising: a spirally-wound elongate bead; and a spirally-wound elongate attached to the bead and extending between adjacent windings of the bead; wherein, in cross-section, the film conforms to the bead so as to form a substantial Omega ($\Omega$)-shape about the bead.

The film, in cross-section, preferably conforms to the bead through an angle of between 210 and 330 degrees, preferably between 240 and 300 degrees, and more preferably about 270 degrees.

The film is bonded to preferably between 55% and 95%, more preferably between 65% and 85%, and most preferably around 75% of a circumference of the bead, in cross-section.

The film preferably forms, in cross-section, an angle of between about 45 degrees and about 135 degrees, preferably between about 80 degrees and about 100 degrees, and more preferably about 90 degrees, at a point of inflection on each side of the bead.

Adjacent windings of the film preferably do not overlap each other.

An apparatus for the delivery of positive pressure respiratory therapy, comprising: the medical tube of any one of the preceding statements, and a patient interface. The patient interface is preferably fluidly coupled with the medical tube. The medical tube may be permanently or removably attached, or attachable, to the patient interface.

A method of forming a conduit, wherein the method comprises: extruding an elongate bead member, extruding a film member, and spirally wrapping the extruded elongate bead member with the extruded film member such that the elongate bead member and the thin film member bond together to form a conduit, wherein the elongate bead member and the elongate film member are wound in an alternating arrangement such that the elongate film of a first winding is separated from the elongate film of a second winding by the elongate bead.

BRIEF DESCRIPTION OF THE DRAWINGS

The aspects of the medical tube disclosed above are described in detail below by reference to various embodiments, which serve as examples only, and with reference to the accompanying drawings, in which.

DETAILED DESCRIPTION OF THE DRAWINGS

Figure 1:
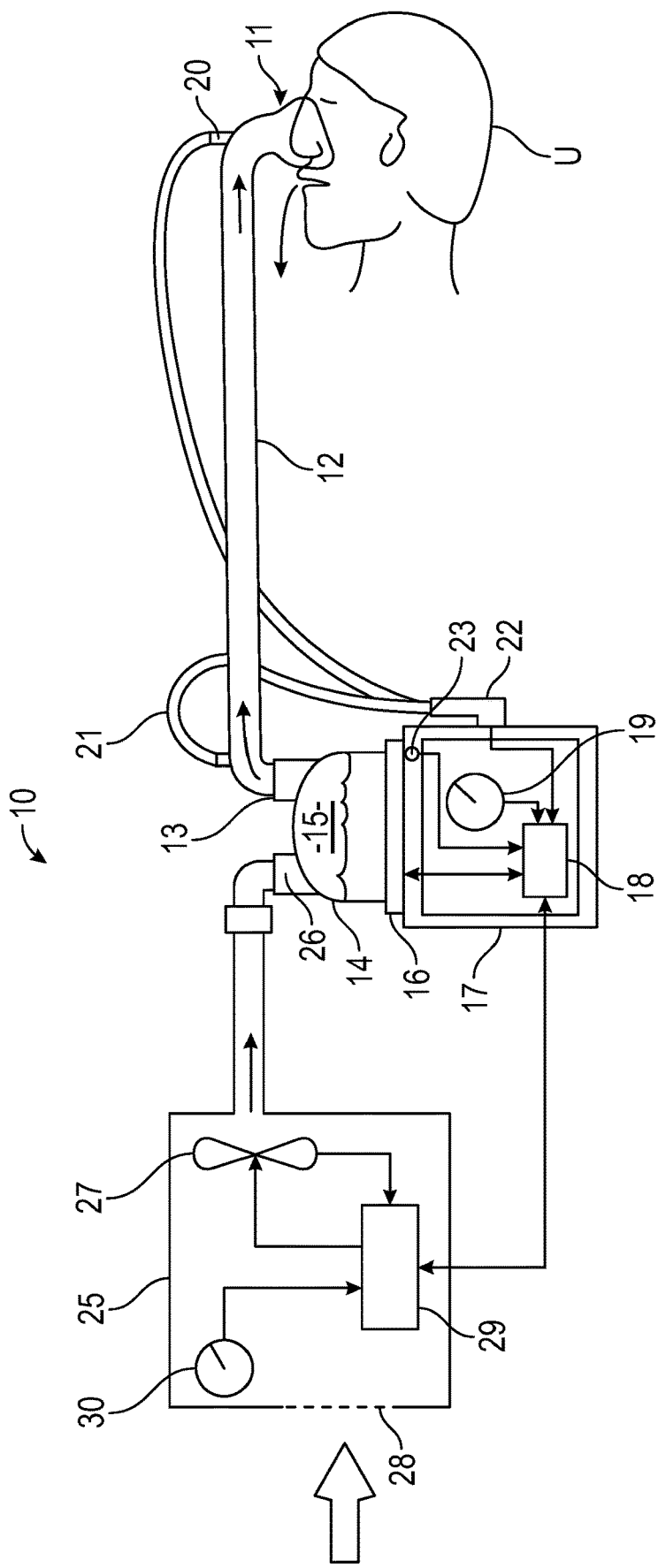
FIG. 1 is a schematic diagram of a positive airway pressure (PAP) system for providing a heated and humidified gasses stream to a user.

Embodiments of the present invention will now be described in the following text, which includes reference numerals that correspond to features illustrated in the accompanying figures. To maintain the clarity of the figures, however, not all reference numerals are included in each figure.

Throughout the specification a number of features of the present invention are defined by various measurements or dimensions, it is to be appreciated that these measurements are to be taken when no external forces, particularly compression or extension forces, are applied to the components. In other words, the measurements and dimensions are to be taken when the components are at rest. In particular, in the case of a medical tube the measurements and dimensions are taken when the tube is laid out on a horizontal surface and neither extended nor compressed by an external force. Similarly, references to an axis of the tube, or components thereof, generally assume that the conduit is arranged substantially linearly. Some measurements may require application of a small external force to straighten the conduit, as will be apparent to a skilled person from the context.

FIG. 1 is a schematic diagram of an example positive airway pressure (PAP) system 10 for providing a heated and humidified air stream to a user U through an interface 11 worn by the user, and which is connected to PAP system 10 by a medical tube 12.

A humidification chamber 14 has a heat conductive base in contact with a heater plate 16 of humidifier 17 to humidify the air stream. Medical tube 12 is connected to an outlet 13 of humidification chamber 14 to convey humidified air to the user interface 11. The humidifier 17 comprises a controller 18, such as a microprocessor-based controller that executes computer software commands stored in an associated memory, for example but without limitation. The controller 18 receives input commands from multiple sources, including a user input interface 19 such as a dial or touch screen, which enables the setting of a predetermined value of humidity, temperature, pressure or other characteristic of the humidified air supplied to the user U. The controller 18 also may receive input from one or more other sources, such as for example temperature and/or flow velocity sensors 20 and 21, which are connected through a connector 22 to communicate with controller 18, and/or a heater plate temperature sensor 23. In response to the user set humidity, pressure or temperature value the controller 19 determines when and/or to what level the heater plate 16 should be energized to suitably heat the water contained in the humidification chamber 14.

As the volume of water in the chamber is heated, water vapour begins to fill the volume 15 of the chamber above a surface of the water. The water vapour passes out of the outlet 13 of the humidification chamber with a flow of air that is provided from a supply 25 such as a blower 27, which enters the humidification chamber 14 through an inlet 26. The blower 27 can be variable in speed fan, or can include a variable pressure regulator. The blower 27 draws air through an inlet 28. The blower can be controlled by controller 29 or controller 18 for example. The controller may control blower speed, regulated pressure, or the like according to any suitable criteria. For example, the controller may respond to inputs from controller 18 and a user set value (e.g., a preset value) of pressure and/or fan speed, which can be set with a user interface 30 (e.g., a dial). The medical tube 12 may comprise a heater such as a heater wire for example, to heat the walls of the conduit to reduce condensation of humidified gases within the conduit.

The medical tubing disclosed in further detail below can be used in such a PAP system as described, whether humidified or not, or alternatively in other forms of respiratory systems, such as for example CPAP (Constant Positive Airway Pressure) systems, VPAP (Variable Positive Airway Pressure) systems, BiPAP (Bi level Positive Airway Pressure) systems, or with a ventilator in NIV (Non-Invasive Ventilation) systems, and with both sealing and non-sealing patient interfaces, and are described herein generally with reference to PAP therapy by way of example only.

The medical tube disclosed in further detail below can be used in a variety of positions throughout a respiratory system, such as for example, the medical tube may be: a relatively short tube integral with a patient interface and arranged to be attached to a conventional tube which is attached to a humidifier or flow source, or a tube arranged to be removably attached between the patient interface and humidifier or flow source, or a tube arranged to be attached between a flow generator and humidifier, or a tube arranged to be attached between a humidifier or flow source and an additional tube which is attached to a patient interface.

Figure 2:
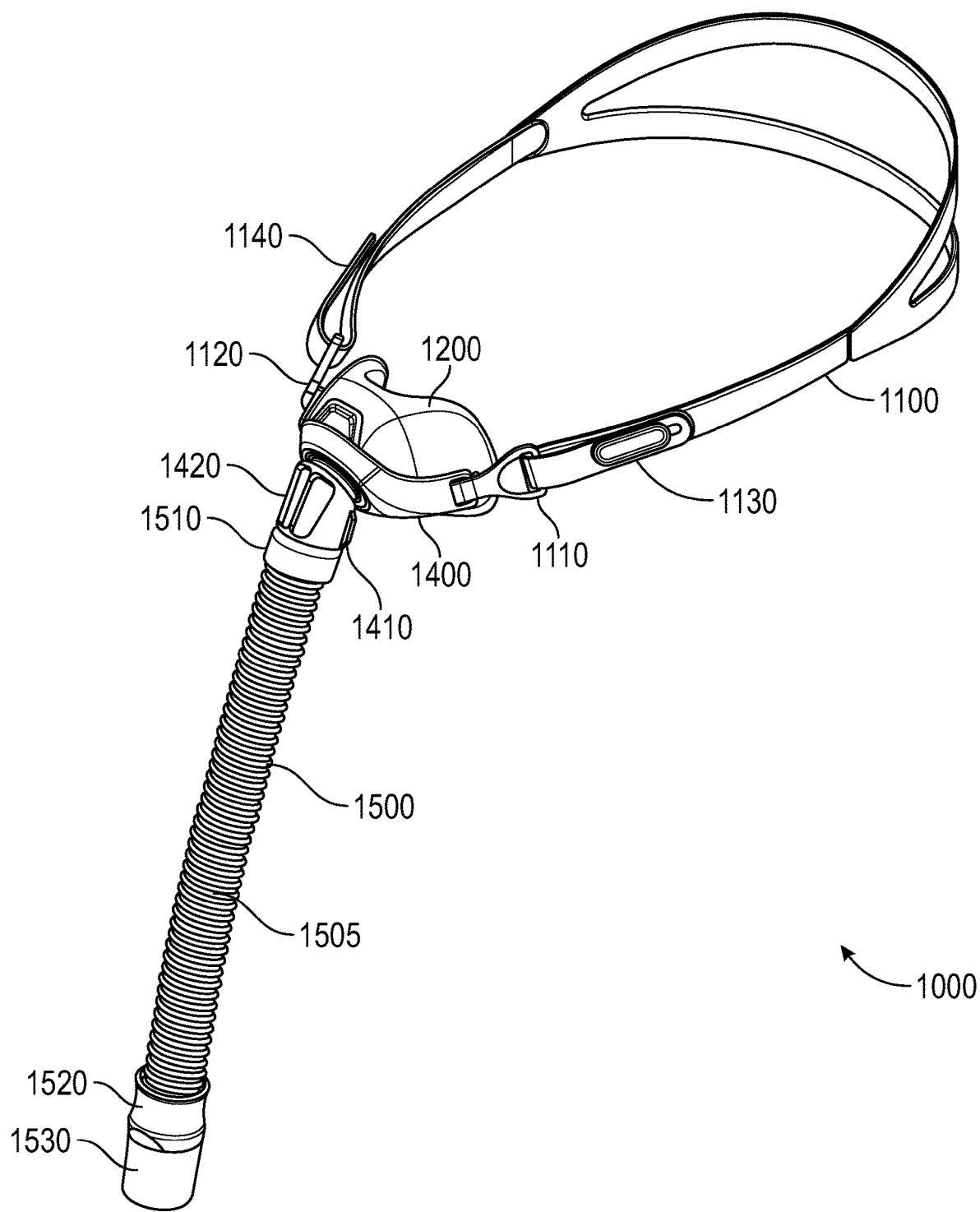
FIG. 2 is an example patient interface connected to a medical tube.

With reference to FIG. 2, an embodiment of a patient interface 1000 is illustrated, the patient interface 1000 being connected to a medical tube 1500. Both the interface 1000 and medical tube 1500, can be used in the field of respiratory therapy and therefore in any respiratory treatment, respiratory assistance, resuscitation or ventilation system. For example, the medical tube 1500 can be used with a suitable patient interface 1000 for administering continuous positive airway pressure ("CPAP") treatment, variable positive airway pressure ("VPAP") treatments, Nasal High Flow ("NHF") therapy, Non-invasive ventilation (NIV) treatments, and/or bi-level positive airway pressure ("BiPAP") treatments. The medical tube 1500 can also be compatible with one or more different types of suitable CPAP systems.

The interface 1000 can comprise any of a plurality of different types of suitable interface embodiments. For example, certain features, aspects and advantages of the present disclosure can be utilized with non-invasive patient interface such as, but not limited to, nasal masks, full-face masks, oronasal masks, nasal pillows, nasal cannula or invasive patient interfaces such as, but not limited to, a tracheostomy tube. Although the illustrated mask is a nasal mask, the scope of the present disclosure is not limited by the particular embodiments described.

In the illustrated embodiment, the interface 1000 comprises a cushion module 1200, a frame 1400 and a tube connector 1410. The cushion module 1200 is configured to cover the user's nose to deliver respiratory gases to the user. The cushion module 1200 can be secured to the frame 1400. The frame 1400 is held in place by a headgear 1100 that wraps around a part or parts of the head of the user U. The tube connector 1410 can be connected to an inlet aperture of the cushion module 1200 and/or frame 1400. In some examples, this can be achieved with a releasable connection. In some embodiments, the tube connector 1410 can include a swivel joint or ball joint to improve flexibility and comfort, and to reduce tube drag by decoupling the tube from the patient interface. In other embodiments, properties of the medical tube 1500 such as its weight, flexibility or extensibility may mean a decoupling mechanism such as a ball joint or swivel joint is not necessary. The tube connector 1410 in this example comprises an elbow connector configured to be connected between the cushion module 1200 and/or frame 1400 and a medical tube 1500 configured for gas delivery. Medical tube 1500 comprises a conduit 1505 with a first connector 1510 at a first end, and a second connector 1520 and a swivel connector 1530 at the opposing second end.

The frame 1400 can couple to the cushion module 1200 and help stabilize the interface 1000 on the face of the user U. The frame 1400 can be any shape and size required to functionally secure the interface 1000 to the user's U face. The frame 1400 may also serve to connect the headgear 1100 to the cushion module 1200. The frame 1400 can be attached to the cushion module 1200 with interlocking clips, tabs or other functional couplers and may be releasably or permanently attached. The frame 1400 can be rigid, substantially rigid or semi-rigid to provide support for the cushion module 1200. For example, the frame 1400 can be at least partially made of a metal or rigid plastic, such as acrylic, polycarbonate, nylon or high-density polyethylene.

The headgear 1100 can couple to the frame 1400 via any suitable mechanism. In the embodiment of FIG. 2, the headgear 1100 removably connects to the frame 1400 via headgear clips 1110, 1120. The headgear clips 1110, 1120 are configured to be received by frame 1400 to enable the tensile forces in the headgear 1100 to be transferred to the patient interface 1000 when it is worn by a user U. Headgear 1100 comprises adjustment mechanisms 1130, 1140 to enable the size or length of a portion of the headgear 1100 to be adjusted such that it can be worn by users of varying head dimensions and shapes, and/or adjust the tension in the headgear 1100 and sealing force between the cushion module 1200 and the user's U face. Alternatively, or additionally, the headgear 1100 may be elastic.

Figure 3:
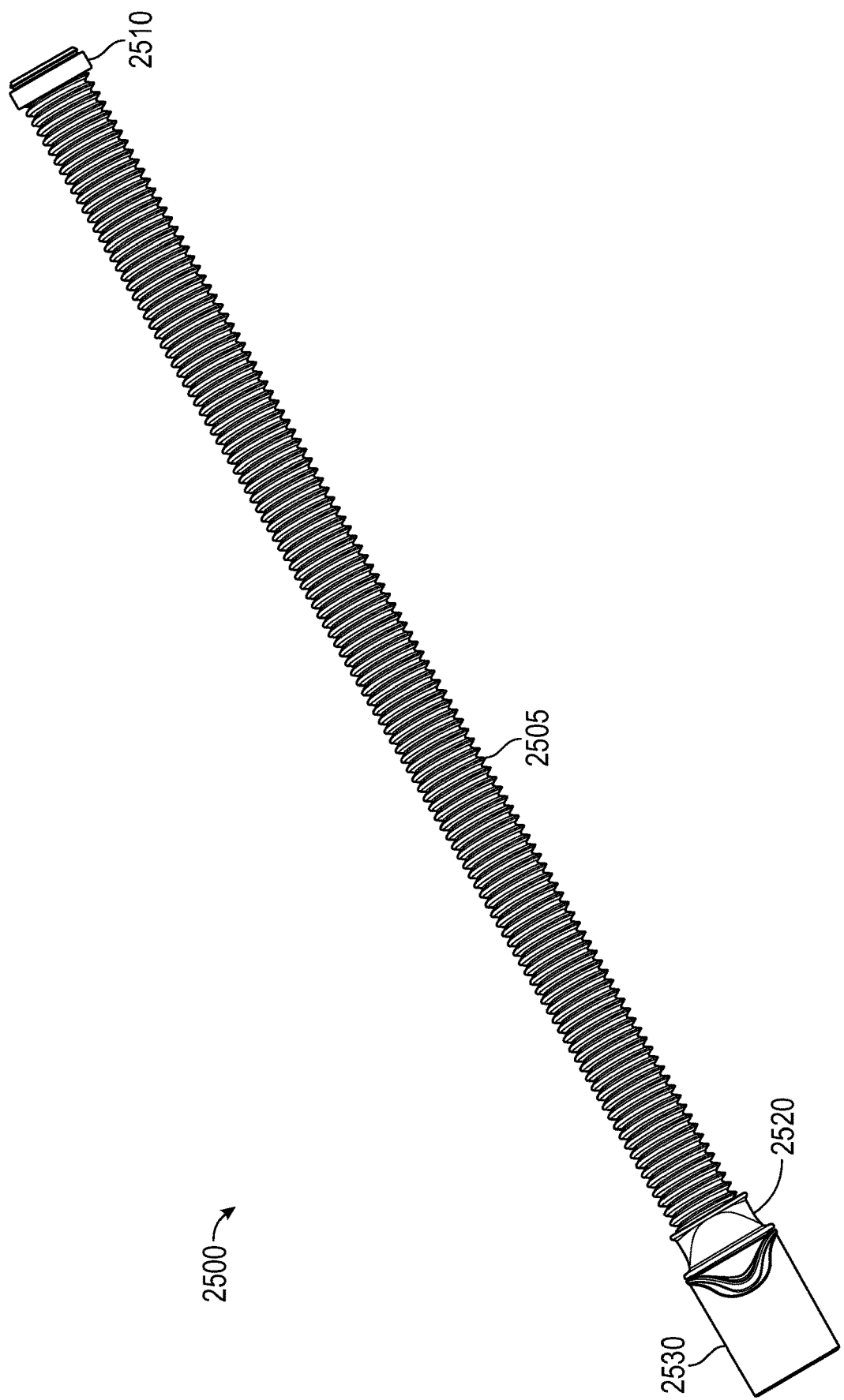
FIG. 3 is perspective view of a medical tube of a first embodiment including first and second connectors and a swivel connector.
Figure 4:
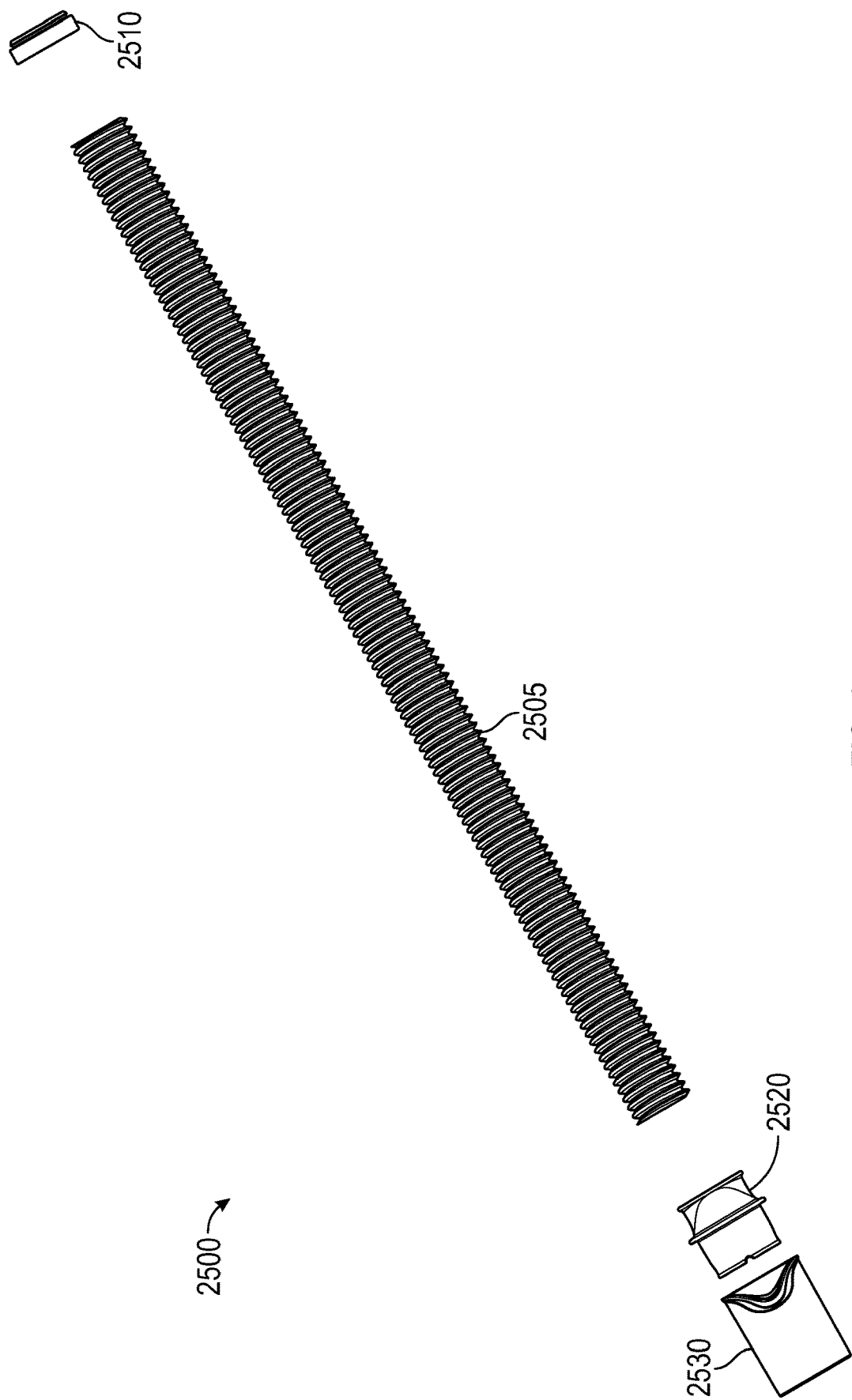
FIG. 4 is an exploded view of the medical tube of FIG. 3.
Figure 12:
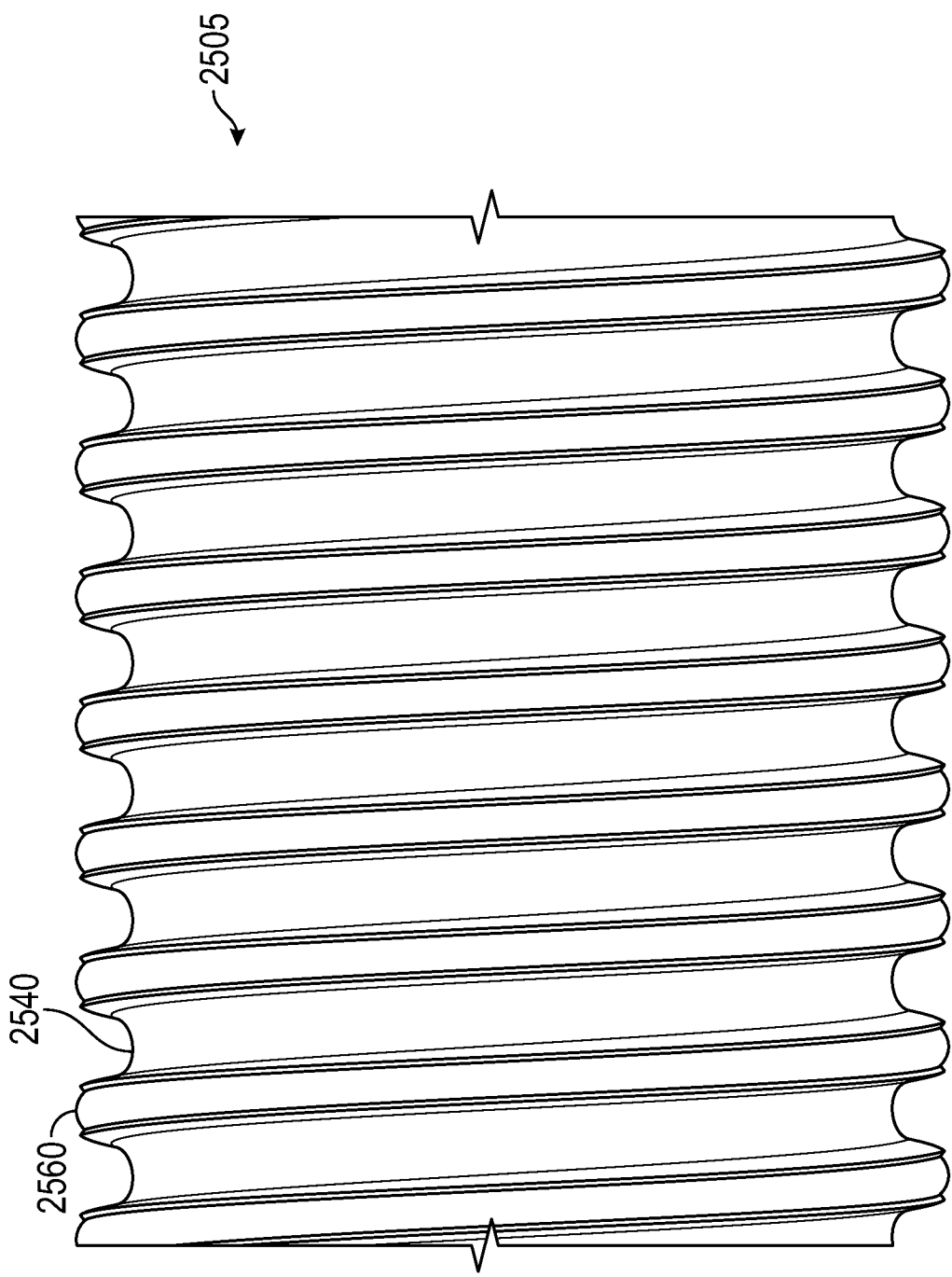
FIG. 12 is a side view of an example section of conduit of the medical tube of FIG. 3.
Figure 13:
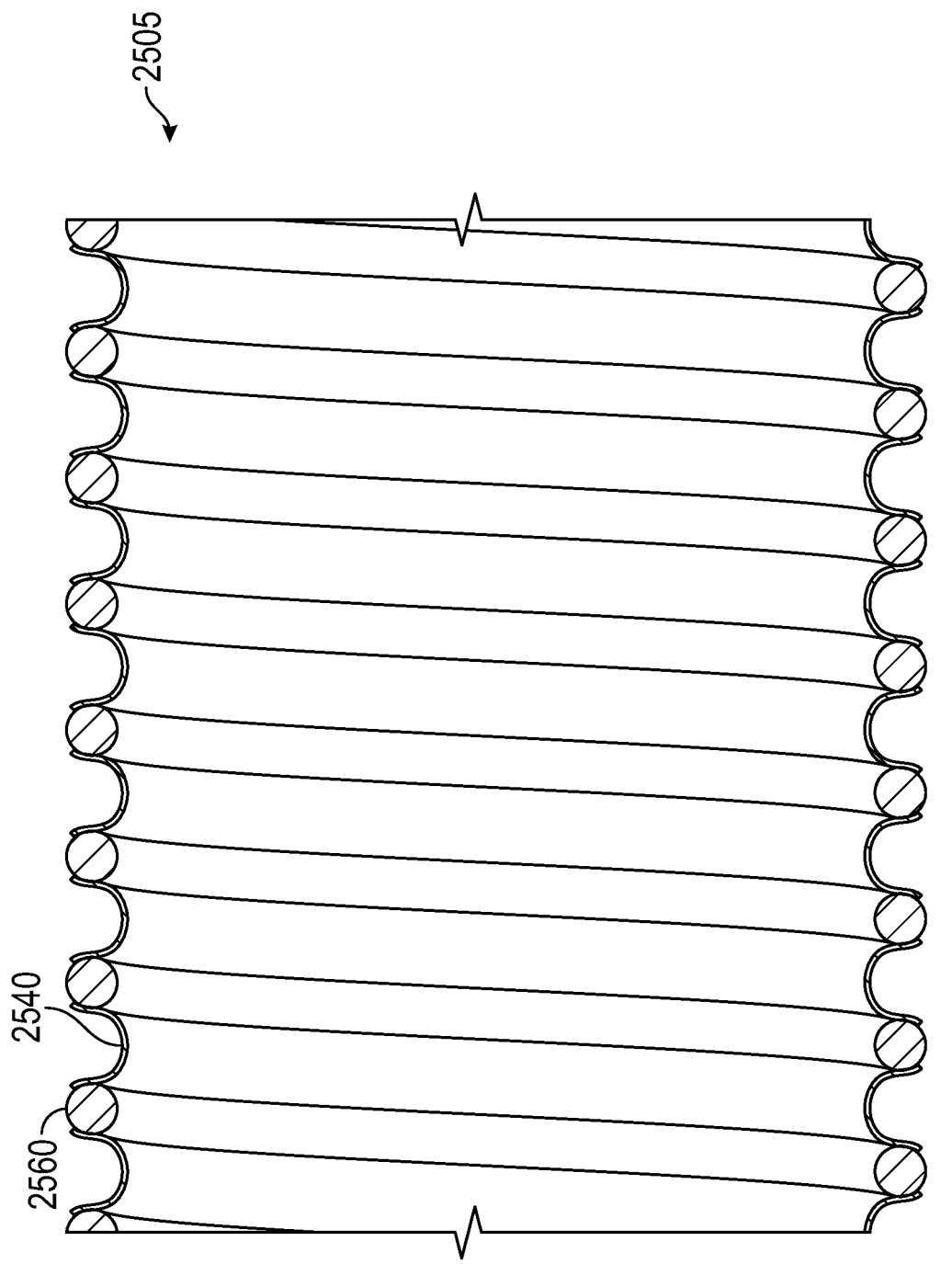
FIG. 13 is a cross-sectional side view of the example section of conduit of FIG. 12.
Figure 14:
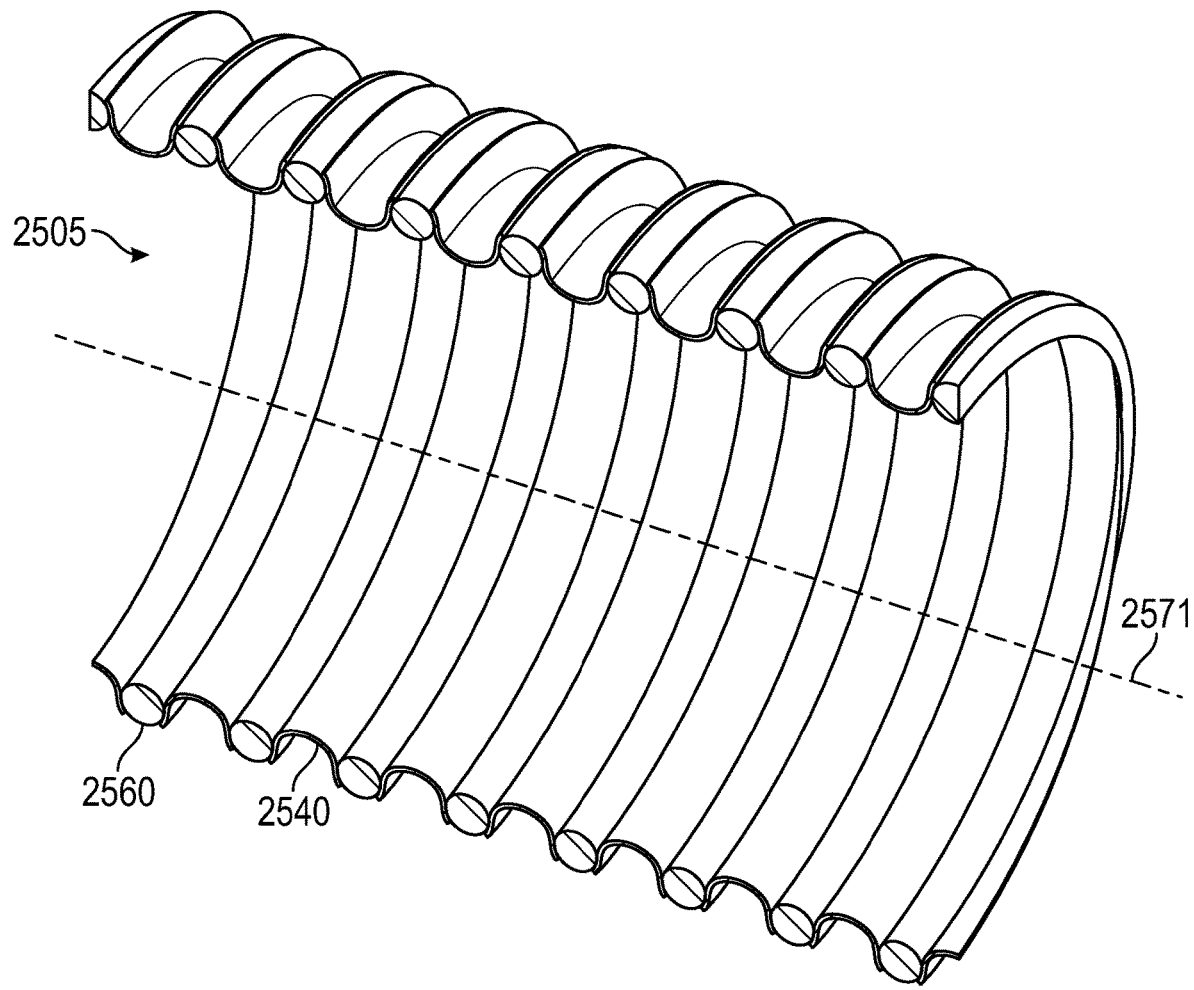
FIG. 14 is a cross-sectional perspective view of the example section of conduit of FIG. 12.

Referring to FIGS. 3, 4 and 12 for illustrative purposes, a medical tube 2500 is shown according to a first embodiment. The medical tube 2500 of the first embodiment comprises conduit 2505 comprising bead 2560 and film 2540. The medical tube 2500 further includes a first connector 2510, a second connector 2520 and a swivel connector 2530. The first connector 2510 is permanently connected to the conduit 2505 at a first end and the second connector 2520 is permanently connected to the conduit 2505 at a second end. The swivel connector 2520 is releasably connected to the second connector 2520. It is to be appreciated that the first connector 2510 and/or the second connector 2520 may be releasably connected to the conduit 2505 in alternative embodiments. A second swivel connector (not shown) may also optionally be provided to the first connector 2510 for rotatable connection to a patient interface.

Figure 5:
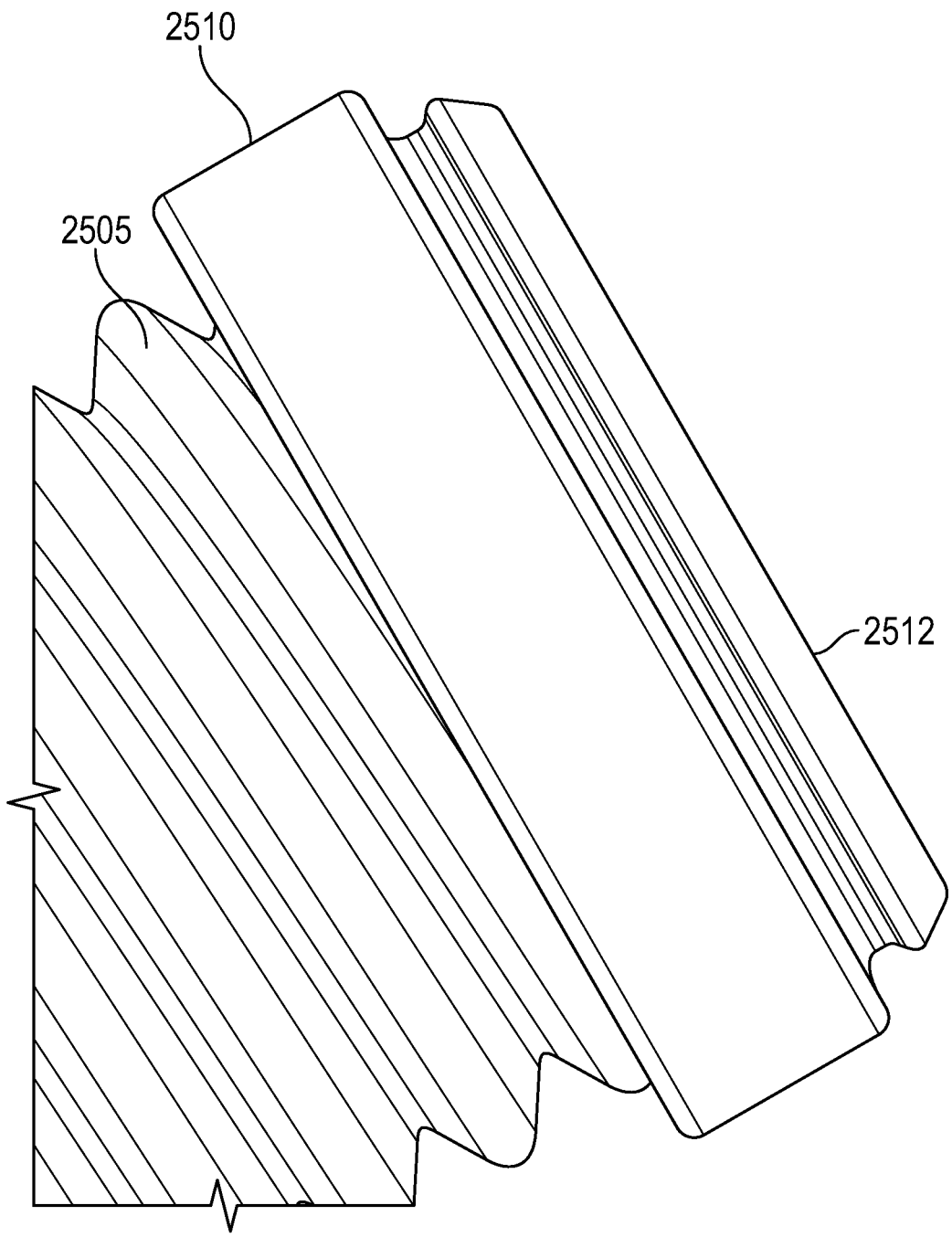
FIG. 5 is a side view of a first connector of the medical tube of FIG. 3.
Figure 6:
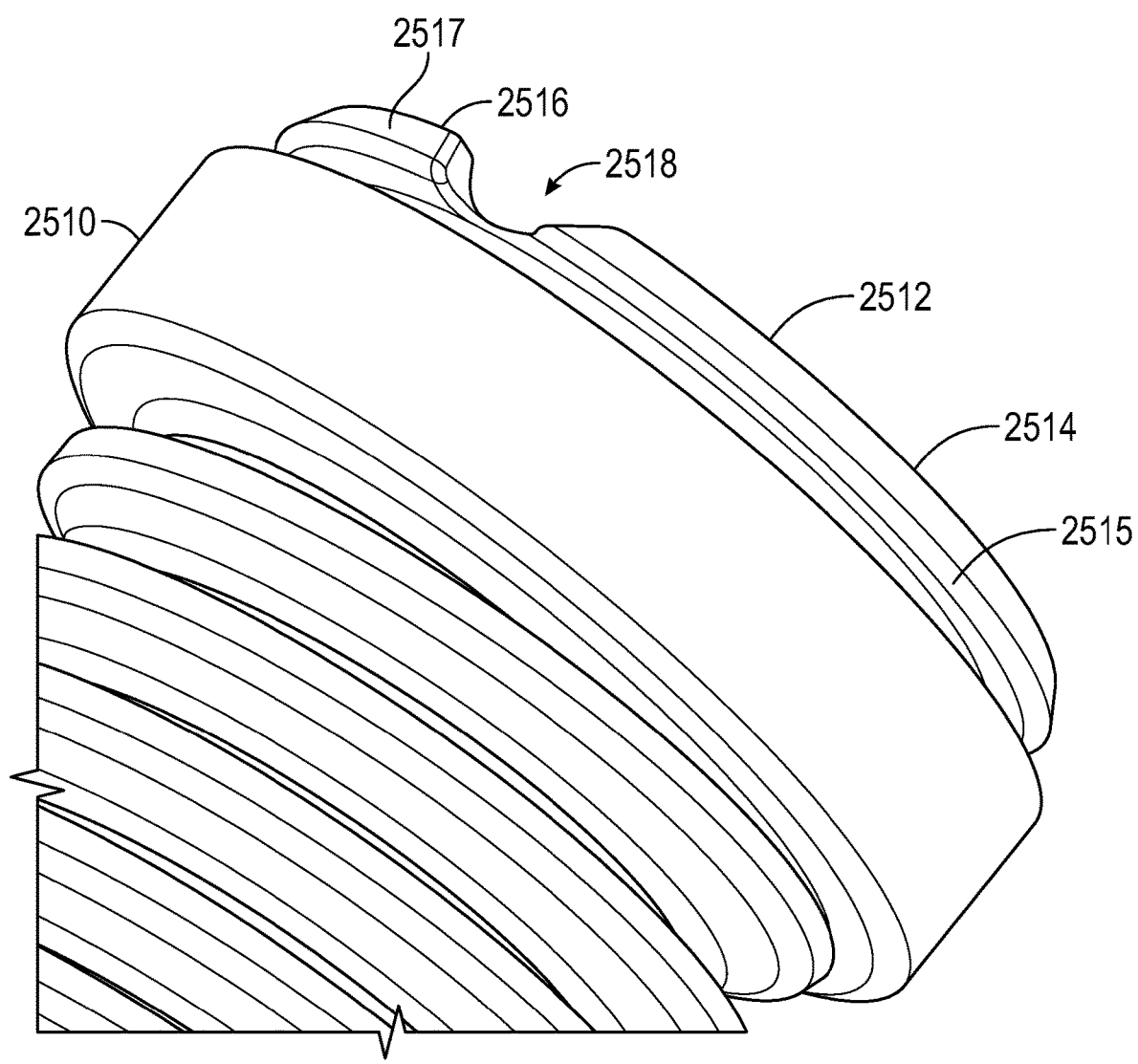
FIG. 6 is a rear perspective view of the first connector of FIG. 5.
Figure 7:
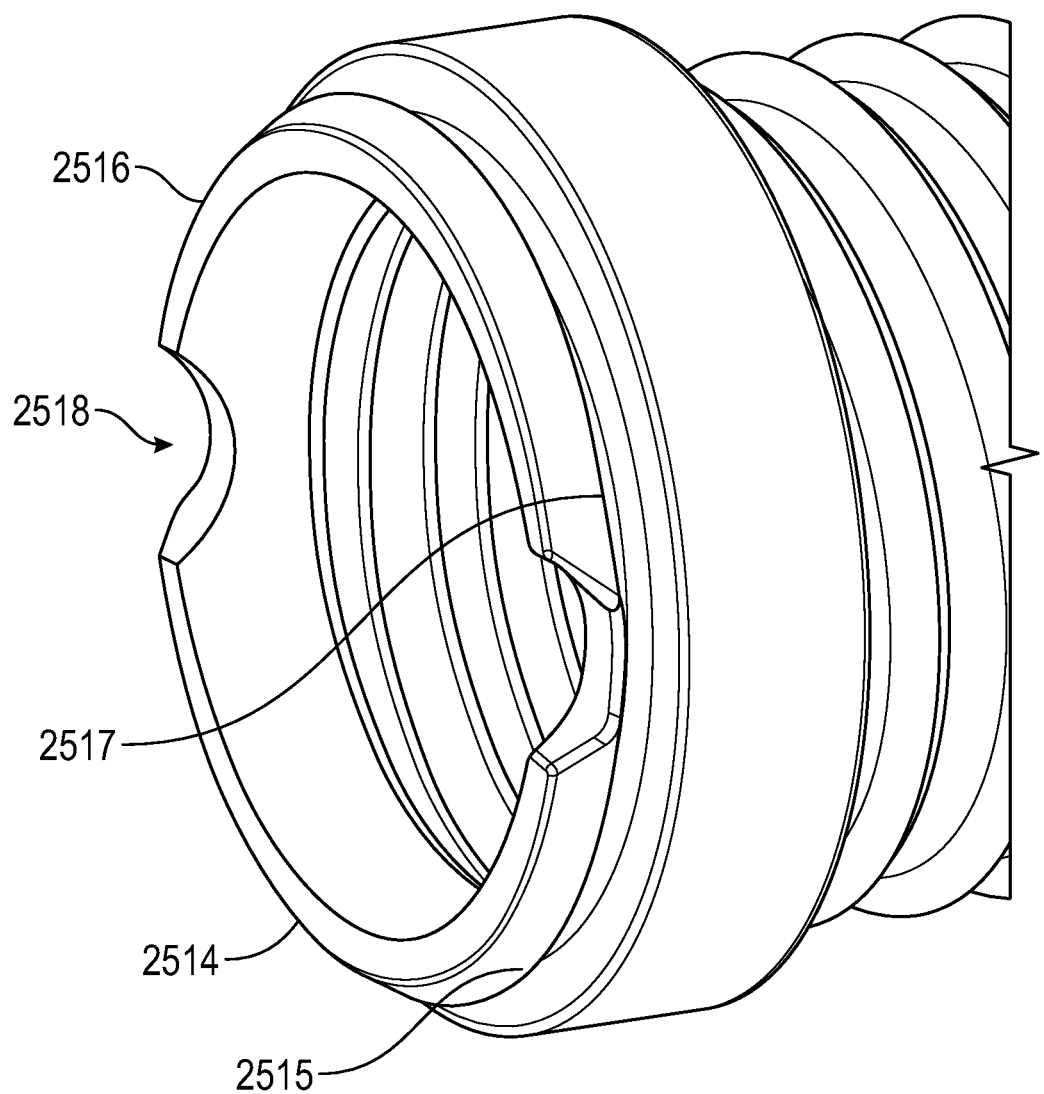
FIG. 7 is a front perspective view of the first connector of FIG. 5.

In a first embodiment, as illustrated in FIGS. 5 to 7, the first connector 2510 is overmoulded to the conduit 2505 at the first end. This forms a permanent connection with the conduit 2505. Although it should be appreciated that any other suitable method could be implemented to achieve a permanent connection between the first connector 2510 and conduit 2505 such as by adhesive means, clamping means, or welding. The first connector 2510 further comprises a snap fit connector 2512, which is configured for connection with a patient interface. The snap fit connector 2512 may comprise a plurality of cantilevered snap fingers, such as a first cantilevered finger 2514 with a protruding lip 2515 and a second cantilevered finger 2516 with a protruding lip 2517 to enable the first connector 2510 to be releasably connected to a patient interface. The snap fit connector 2512 may alternatively be configured for a non-releasable, or permanent, snap fit connection with the patient interface. The first and second cantilevered fingers 2514, 2516 may be substantially symmetric and semi-circular, as shown, each passing through an angle of between approximately 90° and 179°, preferably approximately 130°-150°, and more preferably between approximately 135°-145° about the perimeter of first connector 2510. The first and second cantilevered fingers 2514, 2516 may be defined by notches 2518 formed in the perimeter of the first connector 2510. Notches 2518 allow the protruding lips 2515, 2517 and fingers 2514, 2516 to elastically deform inwardly as the protruding lips 2515, 2517 engage and pass over an obstruction on the patient interface, as described in further detail with respect to snap fit connector 2524, below. The protruding lips 2515, 2517 preferably have a lead-in angle to facilitate this engagement. The protruding lips 2515, 2517 may optionally also have a return angle to facilitate disengagement. The return angle is preferably greater than the lead-in angle, to allow for easy engagement while preventing inadvertent disengagement. In an alternative embodiment, the first connector 2510 can comprise a male or female taper connection for connection with an elbow such as that of the tube connector 1410 seen in FIG. 2 or for connection with a further medical tube.

Figure 8:
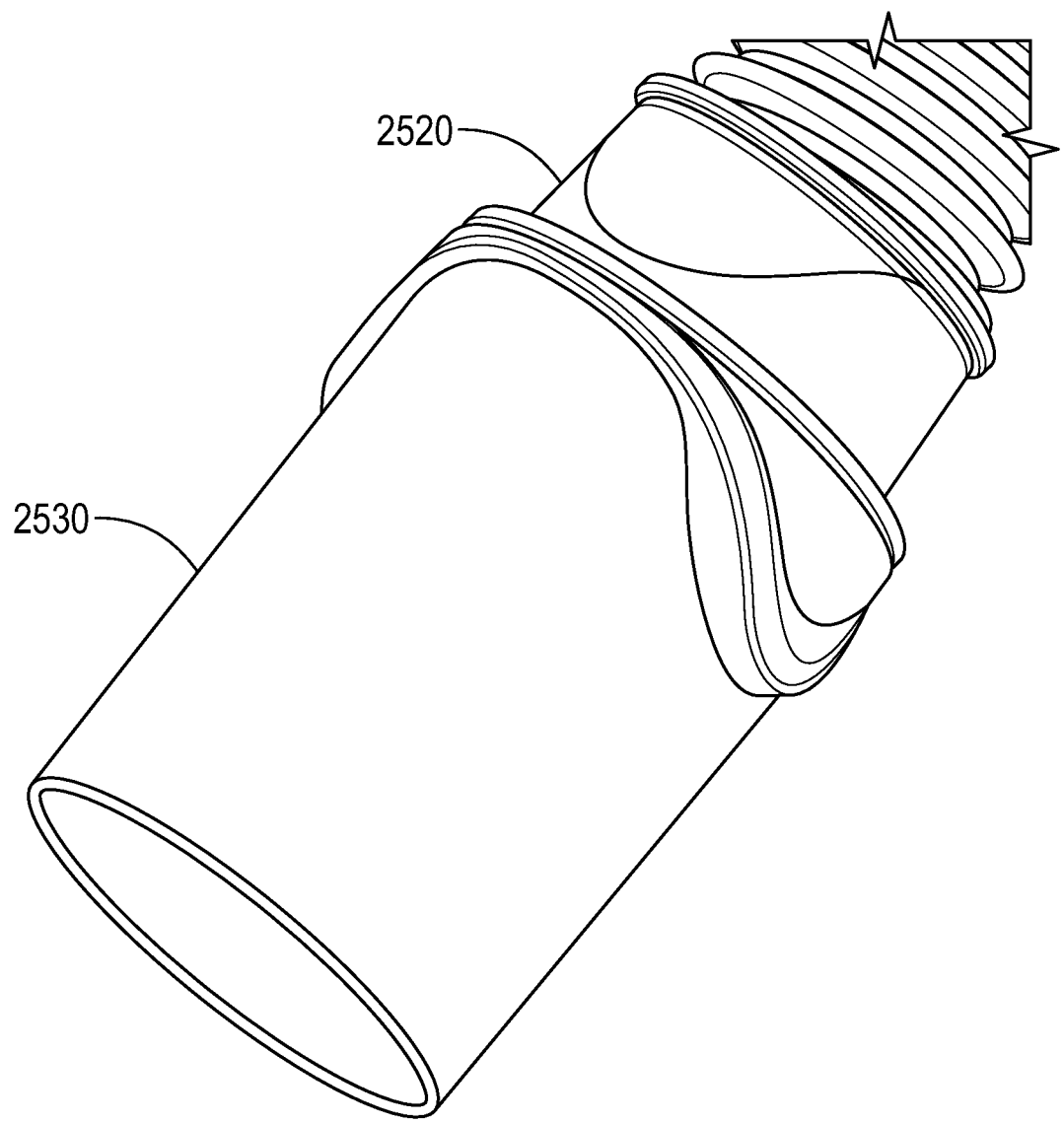
FIG. 8 is a perspective view of a second connector and swivel connector of the medical tube of FIG. 3.

The second connector 2520 is shown in further detail in FIGS. 8 to 11. The second connector 2520 is preferably overmoulded to a second end of conduit 2505, as shown in FIG. 8. As stated with respect to first connector 2510, it is to be appreciated that any other suitable connection method could be implemented instead of overmoulding such as, but not limited to, adhesive means, clamping means or welding. The second connector 2520 comprises a snap fit connector 2524, which is configured for connection with swivel connector 2530. Snap fit connector 2524 comprises a first cantilevered finger 2525 with a protruding lip 2527 and a second cantilevered finger 2526 with a protruding lip 2528 to enable the second connector 2520 to be releasably connected to swivel connector 2530. Fingers 2525, 2526 may be substantially symmetric and semi-circular, and protruding lips 2527, 2528 may comprise lead-in and/or return angles as described above with respect to the corresponding fingers 2514, 2516 and lips 2515, 2517 of first connector 2510. Second connector 2520 further comprises an annular wall 2522 extending around a perimeter of the second connector 2520 and configured for abutment with the swivel connector 2530 when second connector 2520 and swivel connector 2530 are connected together.

Furthermore, the annular wall 2522 may provide a gripping surface to enable a user U to connect and/or disconnect the swivel connector 2530 to/from the second connector 2520. In an alternative embodiment, second connector 2520 may be configured for connection with a further medical tube or for direct connection with a respiratory component that provides a flow of pressurized gasses such as a PAP device, humidifier or ventilator. This may be achieved for example, but not limited to, by a male or female taper connection in place if the snap fit connection 2524.

Figure 9:
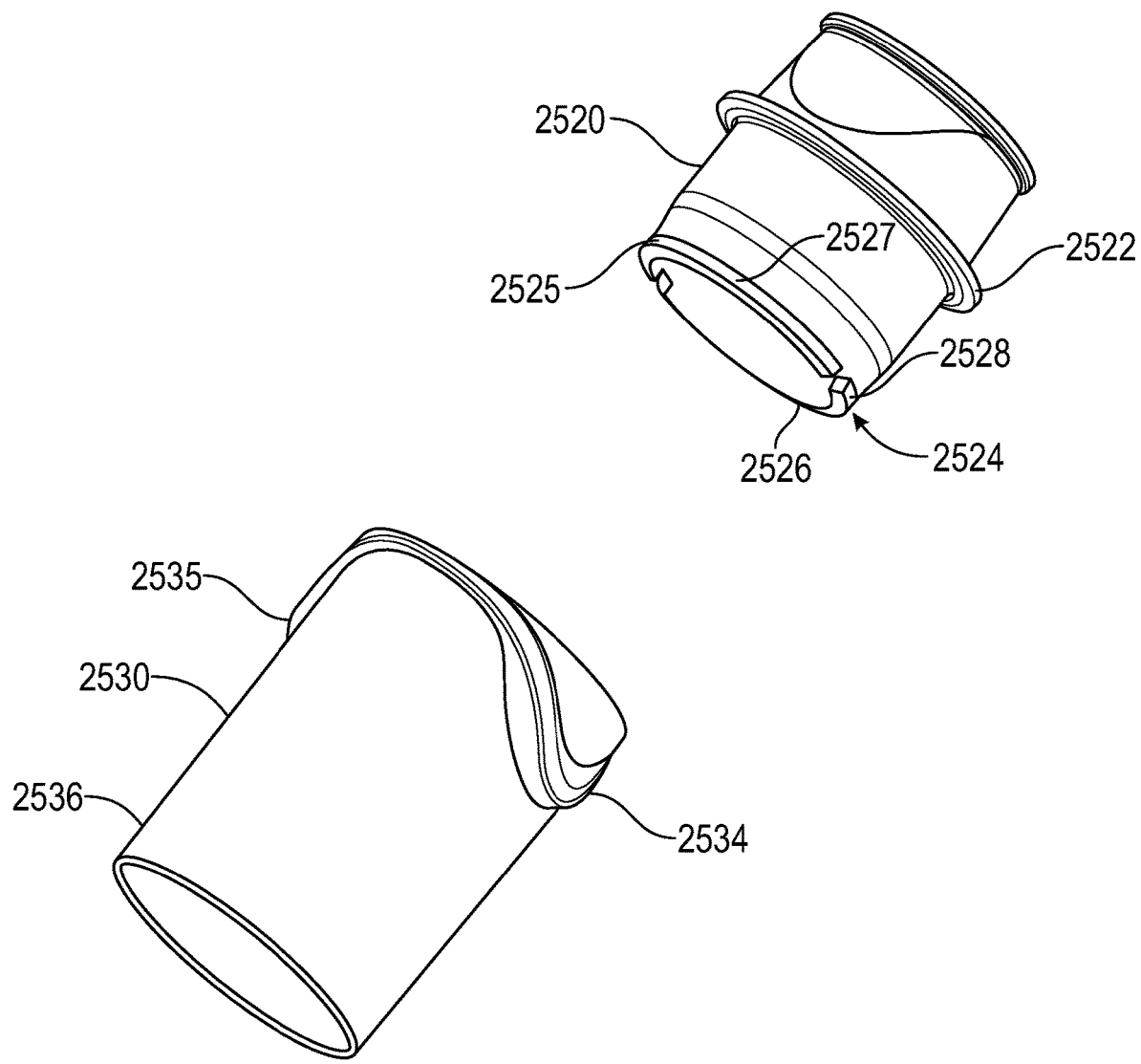
FIG. 9 is an exploded perspective view of the second connector and swivel connector of FIG. 8.
Figure 10:
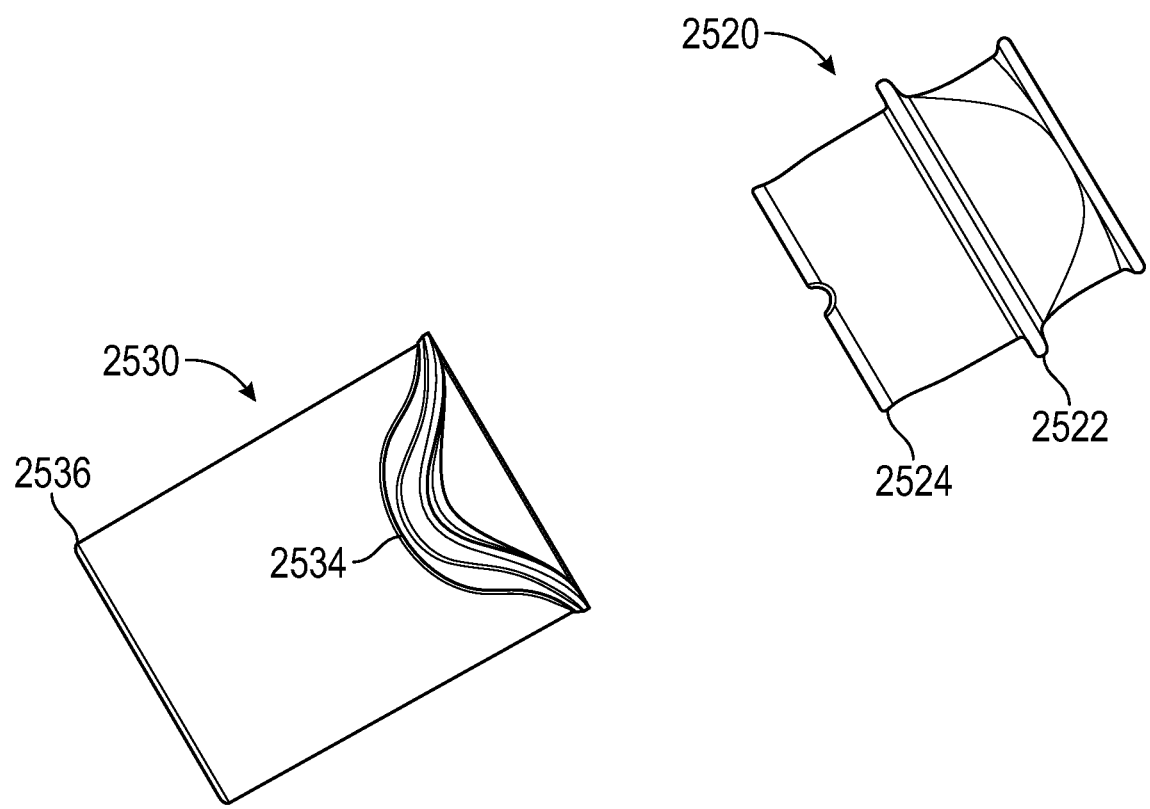
FIG. 10 is an exploded side view of the second connector and swivel connector of FIG. 8.
Figure 11:
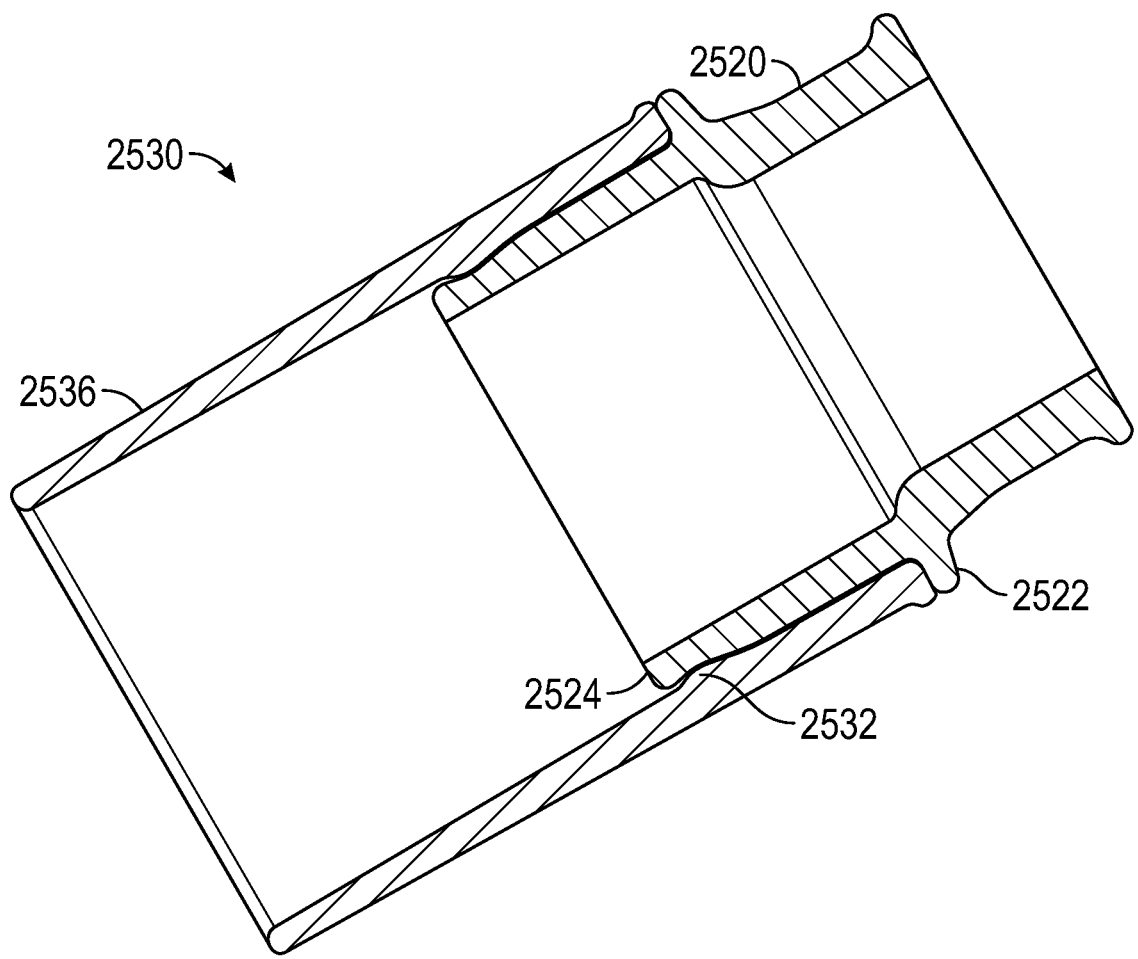
FIG. 11 is a cross-sectional side view of the second connector and swivel connector of FIG. 8.

Referring to FIGS. 9 to 11 for illustrative purposes, swivel connector 2530 is shown comprising taper connection 2536 at a first end, with the second end being configured for connection with second connector 2520 and including interference bump 2532. In a first embodiment, as shown in FIG. 11, interference bump 2532 comprises an annular protrusion on an inner surface of swivel connector 2530 configured to interact with first finger 2525 and second finger 2526 of second connector 2520. During connection, second connector 2520 is partially inserted into swivel connector 2530 such that the protruding lips of deformable fingers 2525, 2526 contact interference bump 2532 and cause the fingers 2525, 2526 to elastically deform. As the protruding lips of the fingers 2525, 2526 travel past interference bump 2532 they elastically return creating a releasable snap fit connection between swivel connector 2530 and second connector 2520.

The type of snap fit connection formed between swivel connector 2530 and second connector 2520 provides a swivel joint which allows for the swivel connector 2530 to rotate relative to the second connector 2520, about the common axis of the assembled swivel connector 2530 and second connector 2520. This allows some rotational decoupling to occur between the medical tube 2500 and further medical tubes or respiratory components to which it may be connected. Extension (and, to a lesser extent, compression) of spiral-wound tubes tends to generate a torsional force which can be transmitted to connected components. The swivel joint serves to reduce torsional forces being transmitted to the patient interface or connected components via medical tube 2500. In an additional embodiment, first connector 2510 may also comprise, or be directly attached to, a swivel joint to reduce forces and torsion being transmitted to the patient interface via medical tube 2500. In some embodiments, the medical tube may provide suitable flexibility, elongation or reduced mass such that swivel connector 2530 is not required. In those embodiments, the second connector 2520 can connect directly to a further medical tube or respiratory component, without the intermediate swivel connector 2530.

Swivel connector 2530 further comprises a pair of finger grips 2534, 2535 to aid in removing and/or replacing swivel connector 2530 from/to second connector 2520.

Figure 16:
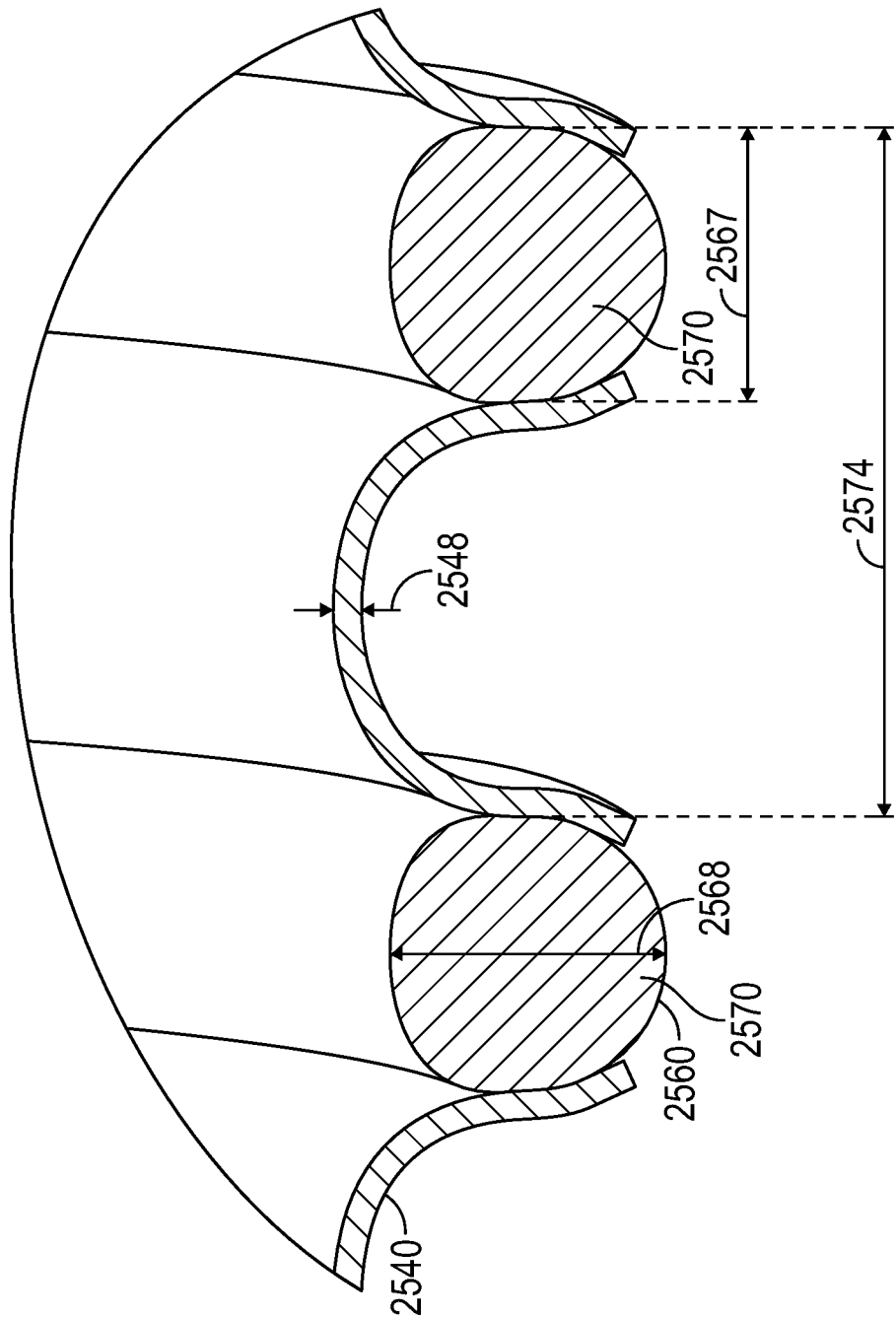
FIG. 16 is a detailed cross-sectional view of a lower part of the conduit of the medical tube of FIG. 3.
Figure 17:
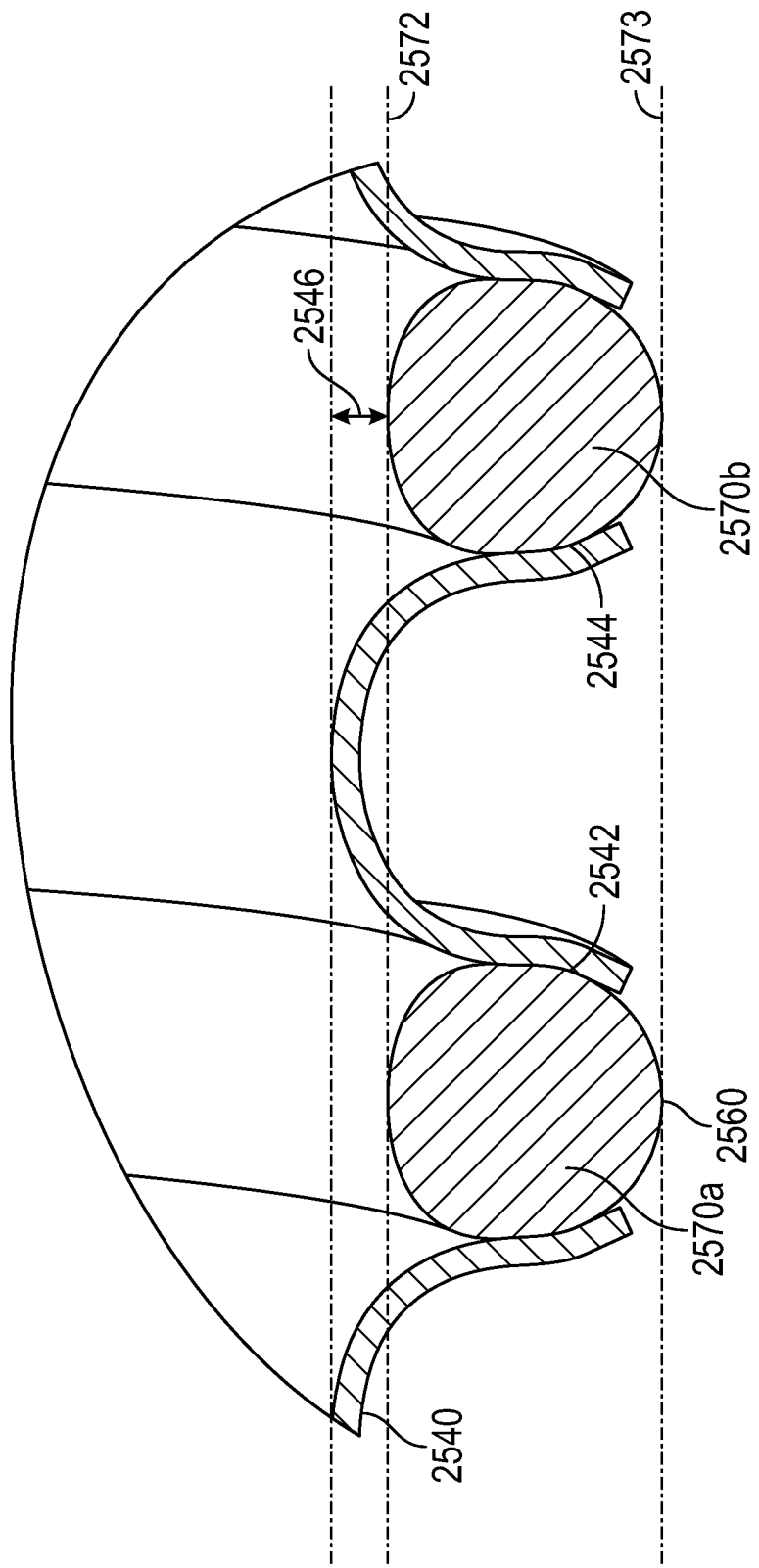
FIG. 17 is a detailed cross-sectional view of a lower part of the conduit of the medical tube of FIG. 3.
Figure 18:
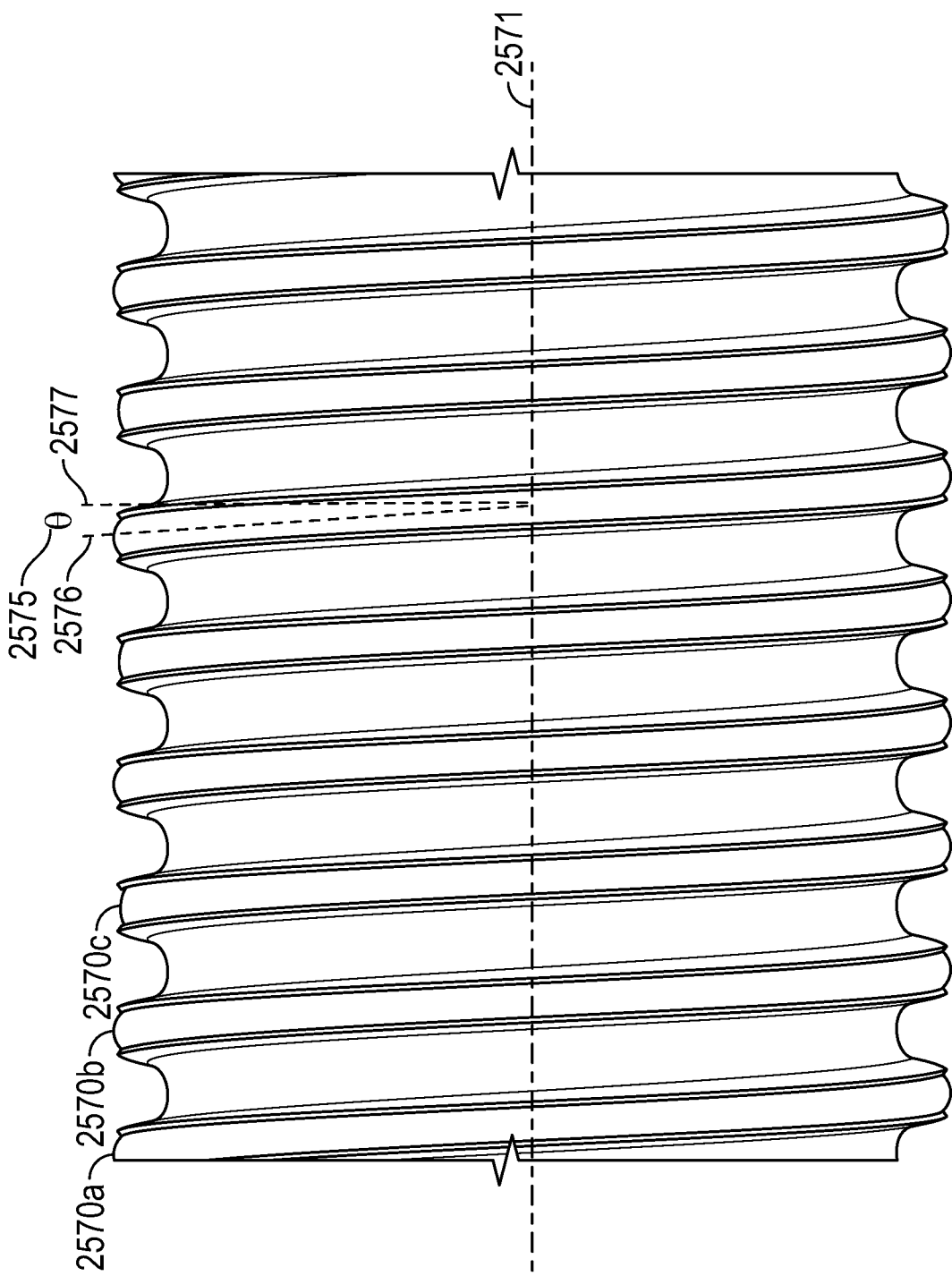
FIG. 18 is a side view of the example section of conduit of FIG. 12.
Figure 19:
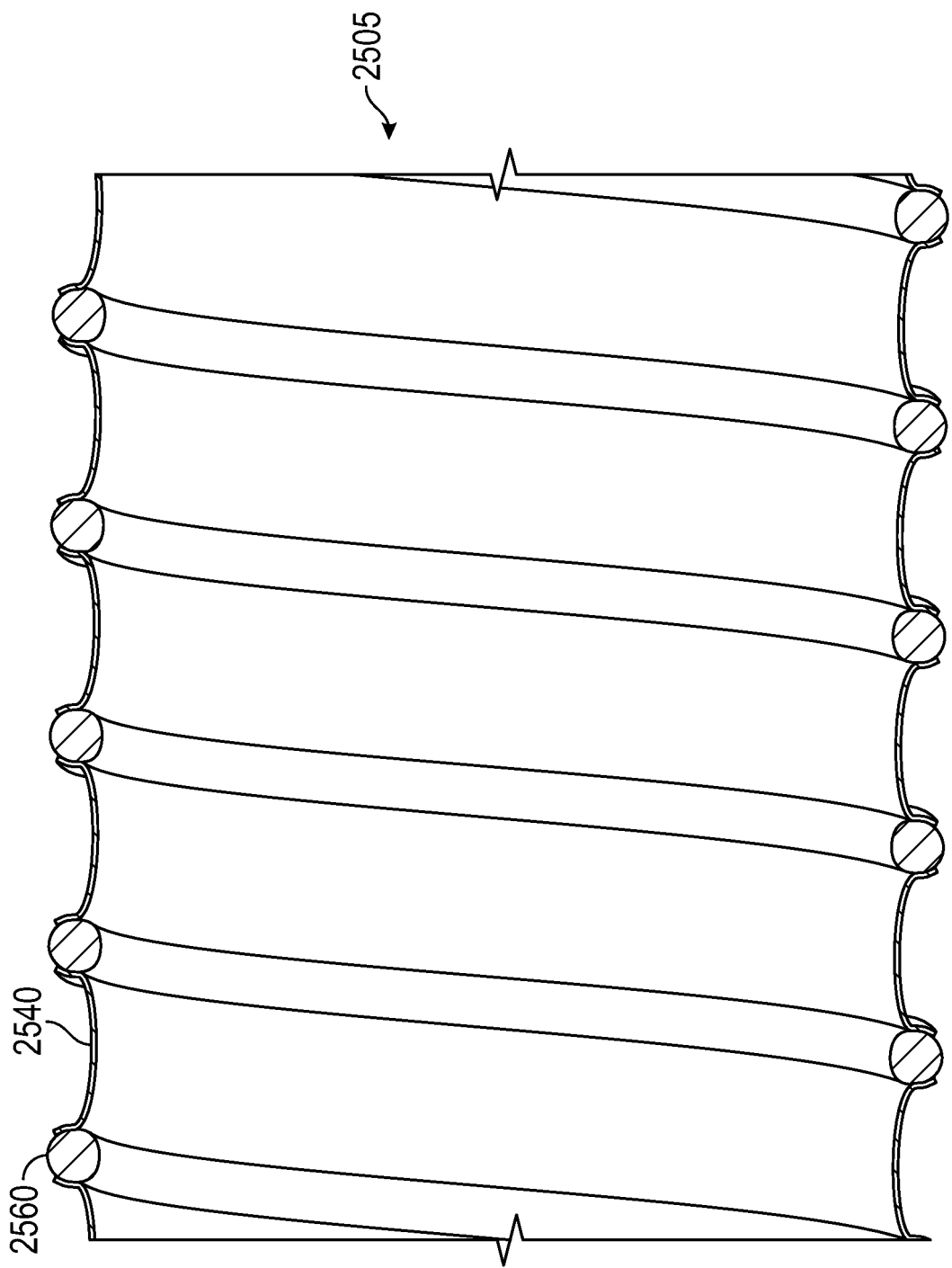
FIG. 19 is a cross-sectional side view of an example section of the conduit of the medical tube of FIG. 3 in an elongated state.

Referring to FIGS. 12 to 19, for illustrative purposes, various views of an example section of conduit 2505 are shown. Conduit 2505 comprises a single continuous bead 2560 and a single continuous film 2540. In a first embodiment, during manufacture, bead 2560 is extruded and subsequently wound around one or more rotating mandrels to form a spiral formation comprising a plurality of coils 2570. The plurality of coils 2570 may be in a successive arrangement of individual coils 2570a, 2570b, 2570c, as shown in FIG. 18, such that they follow one another continuously in an unbroken sequence. In the context of conduit 2505, a coil 2570 can be described as a single turn of the spirally wound bead 2560. Alternatively, in another definition, a spiral can be said to be a three-dimensional curve with multiple turns around a longitudinal axis 2571, and a coil 2570 is defined as a single turn around the longitudinal axis 2571. Referring to FIG. 18 for illustrative purposes, three individual coils 2570a, 2570b, 2570c are indicated to further emphasize how each of the plurality of coils 2570 are defined.

It is to be appreciated that in an alternative embodiment, conduit 2505 can comprise a plurality of continuous beads such that, for example, multiple spiral formations are formed. In this example, the plurality of beads may be arranged such that the multiple spiral formations are positioned in a double-helix or triple-helix formation.

In a first embodiment, the plurality of coils 2570 are substantially circular when viewed in a plane perpendicular to the longitudinal axis 2571 of the conduit 2505. As such, each of the plurality of coils 2570 has an internal diameter 2572 and an external diameter 2573. The plurality of coils 2570 may be non-circular, and in particular elliptical, in an alternative embodiment; in such an embodiment, each of the plurality of coils 2570 would have a minor and major internal diameter, and a minor and major external diameter.

Figure 15:
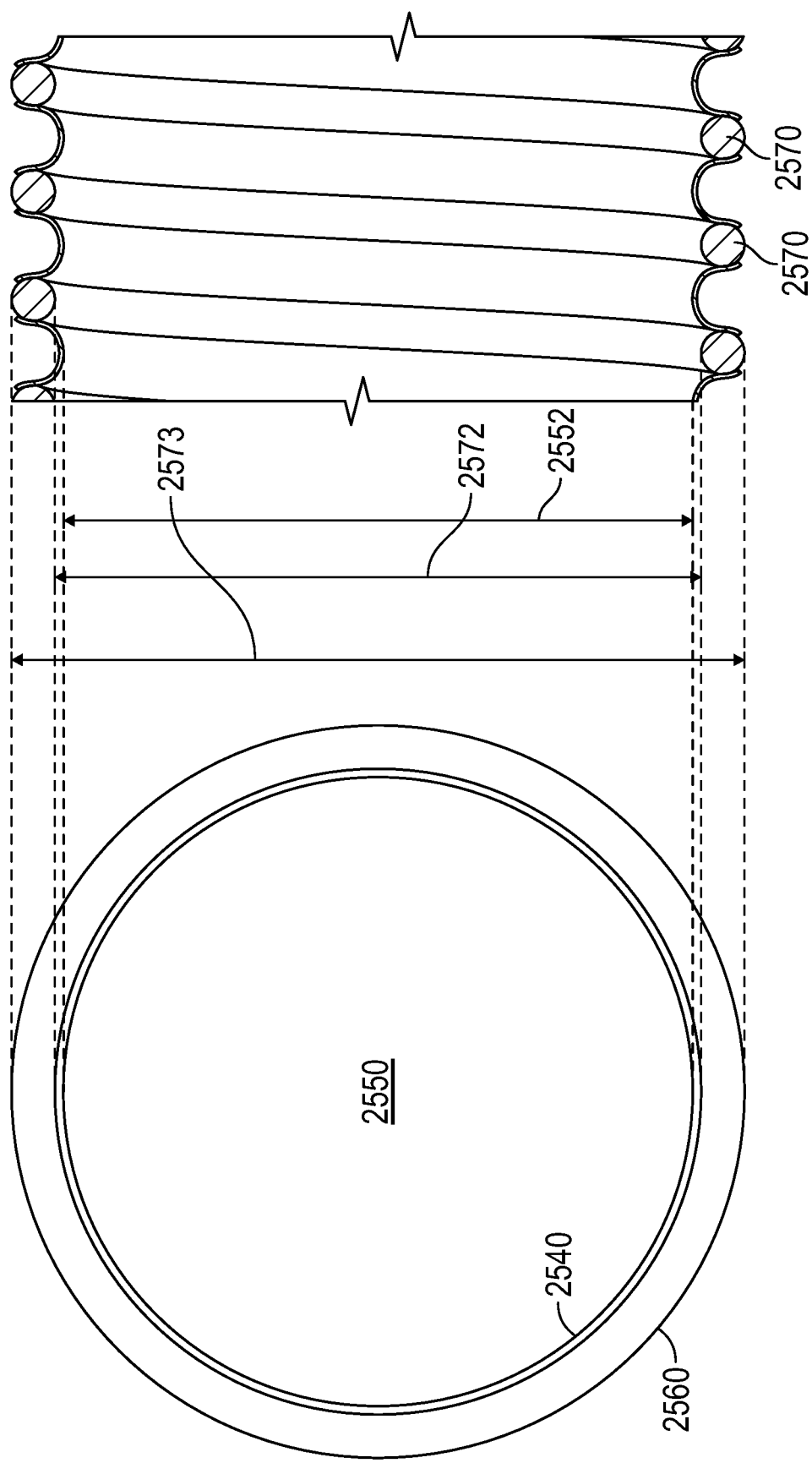
FIG. 15 is a partial cross-sectional side view and end view of the example section of conduit of FIG. 12.

Referring now to FIG. 15 the plurality of coils 2570 have a substantially uniform internal diameter 2572 and a substantially uniform external diameter 2573. That is, each coil 2570a, 2570b, 2570c of the plurality of coils 2570 are substantially identical in dimensions (i.e. at least width, height and winding radius of the bead 2560). In alternative embodiments, however, at least one of the plurality of coils 2570 may have an internal diameter 2572 and/or external diameter 2573 that differs from at least one other of the plurality of coils 2570, such that conduit 2505 varies in cross-sectional shape and/or size along its longitudinal axis 2571, when at rest. For example, a diameter of the conduit may suddenly or gradually increase or decrease along the length of the conduit. In another alternative embodiment, the conduit may comprise a pair of beads in a double-helix formation, wherein each of the pair of beads comprise different dimensions.

Referring still to FIG. 15, in a first embodiment, the internal diameter 2572 of each of the plurality of coils 2570 is between about 10 mm and 17 mm, preferably between about 15 mm and 16 mm, more preferably about 15.4 mm and most preferably 15.0 mm (±0.2 mm).

In a first embodiment, the external diameter 2573 of each of the plurality of coils 2570 is between about 11 mm and 18 mm, preferably between about 17 mm and 18 mm, and more preferably about 17.4 mm. Alternatively, the upper limit of the external diameter 2573 of each of the plurality of coils 2570 may be between about 16 mm and 20 mm, preferably between 17 mm and 19 mm, and most preferably about 18.2 mm. That is, the external diameter 2573 may be between 11 mm and 20 mm, or preferably between 17 mm and 18.2 mm, for example.

Referring now to FIG. 16, the plurality of coils 2570 have a pitch 2574. Pitch 2574 is defined as a distance between successive corresponding points of adjacent coils of the plurality of coils 2570 along an axis parallel to longitudinal axis 2571. In a first embodiment the plurality of coils 2570 have a substantially uniform pitch 2574 between successive coils 2570 of the conduit 2505, though it is to be appreciated that in an alternative embodiment, the plurality of coils 2570 may have a pitch 2574 that varies between a first adjacent pair and a second adjacent pair of the plurality of coils 2570 such that pitch 2574 varies along the longitudinal axis 2571 of conduit 2505 when the tube is at rest and no external forces are applied.

In a first embodiment, the pitch 2574 of the plurality of coils 2570 is between about 1.5 mm and 3.5 mm, preferably between about 2 mm and 3 mm, and more preferably about 2.5 mm. Most preferably the pitch is 3.3 mm (±0.3 mm).

Referring now to FIG. 18, the plurality of coils 2570 comprises a coil angle θ 2575. In a first embodiment, the coil angle 2575 is illustrated in FIG. 18. When the plurality of coils 2570 of the conduit 2505 are viewed from a side view, with the longitudinal axis 2571 positioned such that it extends from left to right, a notional line 2576 can be drawn through the center of each visible portion of the plurality of coils 2570. The angle formed between this notional line 2576 and a second notional line 2577 extending perpendicularly from the longitudinal axis 2571 is the coil angle 2575. The coil angle 2575 defines the spiral formation that is formed, if the coil angle 2575 were 0 degrees no spiral would be formed and instead a single hoop would be formed.

In a first embodiment the plurality of coils 2570 have a substantially uniform coil angle 2575 between successive coils 2570a of the plurality of coils 2570 of the conduit 2505 when the conduit 2505 is at rest and no external forces are applied. Though it is to be appreciated that in an alternative embodiment, the plurality of coils 2570 may have a coil angle 2575 that differs between two or more of the plurality of coils 2570 such that coil angle 2575 varies along the longitudinal axis 2571 of conduit 2505. It is to be further appreciated that the coil angle 2575 will also vary in use, as the conduit 2505 (or a portion thereof) is compressed or elongated.

In a first embodiment, the coil angle 2575 of the plurality of coils 2570 is between about 3 degrees and 6 degrees, preferably between about 4 degrees and 5 degrees, and more preferably about 4.5 degrees.

Figure 21:
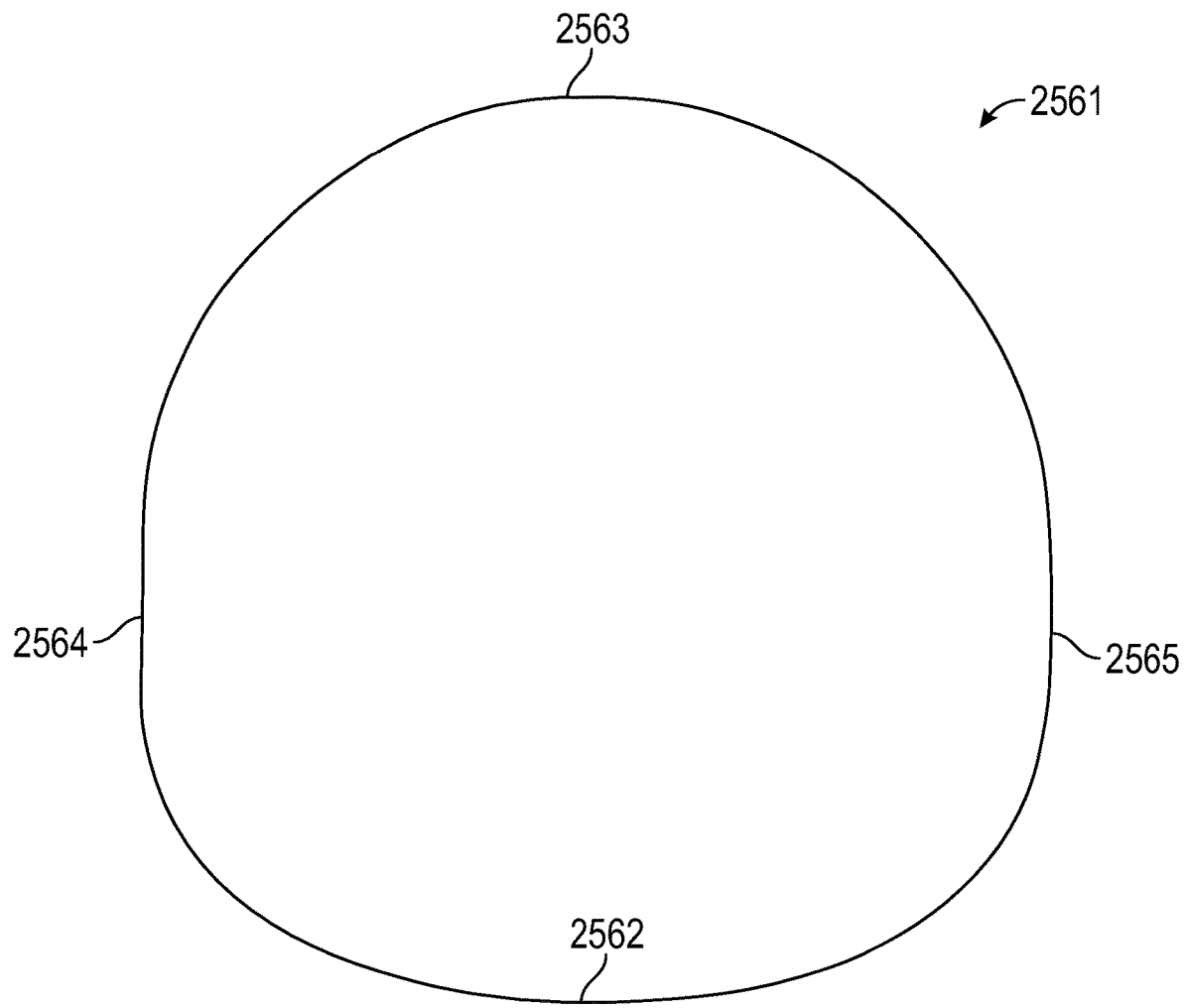
FIG. 21 is a cross-sectional view of the bead of the conduit of the medical tube of FIG. 3.

Referring now to FIG. 16 and FIG. 21, cross-sectional detailed views of portions of conduit 2505 are shown. In a first embodiment, the cross-sectional shape 2561 of bead 2560 is substantially D-shaped. In an alternative description the cross-sectional shape 2561 of bead 2560 consists of a semi-circle 2563 and semi-oval 2562 joined at free ends by substantially linear portions 2564, 2565, this is best illustrated in FIG. 21. It can be seen that the example cross-sectional shape 2561 shown in FIG. 21 therefore has reflective symmetry about its major axis (vertical axis, as illustrated), but not its minor axis (horizontal axis, as illustrated). Because the minor diameter of the semi-oval 2562 is significantly smaller than the diameter of semi-circle 2563, the overall cross-sectional shape 2561 can be said to be substantially D-shaped. It is to be appreciated that the cross-sectional shape 2561 in alternative embodiments could be any suitable shape such as, but not limited to, elliptical, rectangular, circular, or polygonal.

Figure 24:
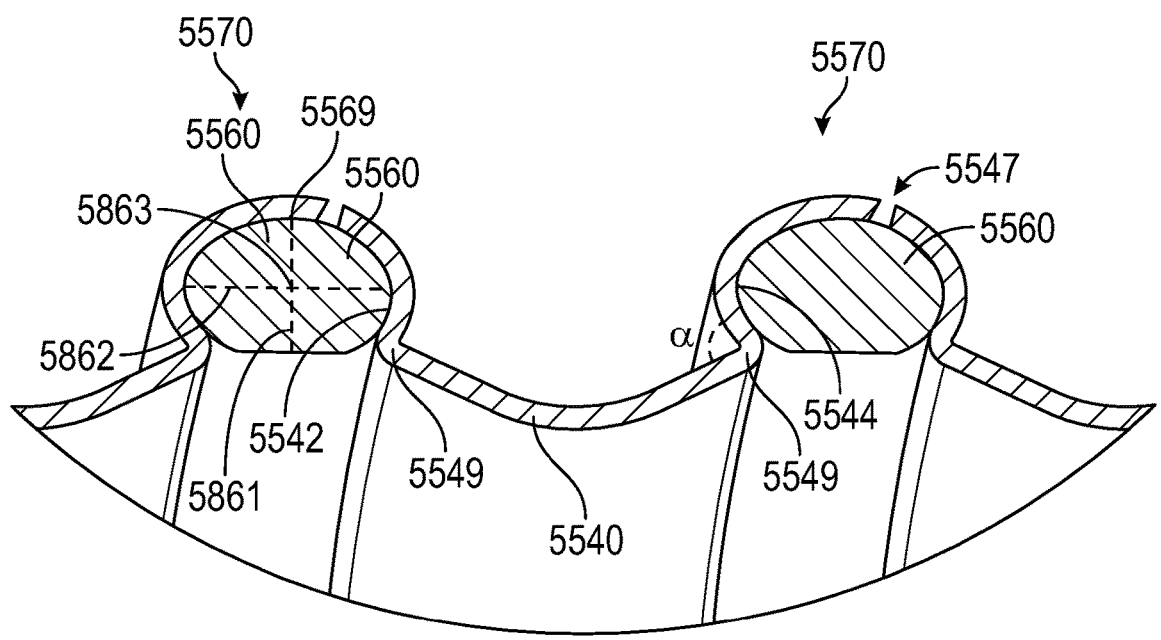
FIG. 24 is a detailed cross-sectional view of an upper part of a conduit according to a fourth embodiment.
Figure 25:
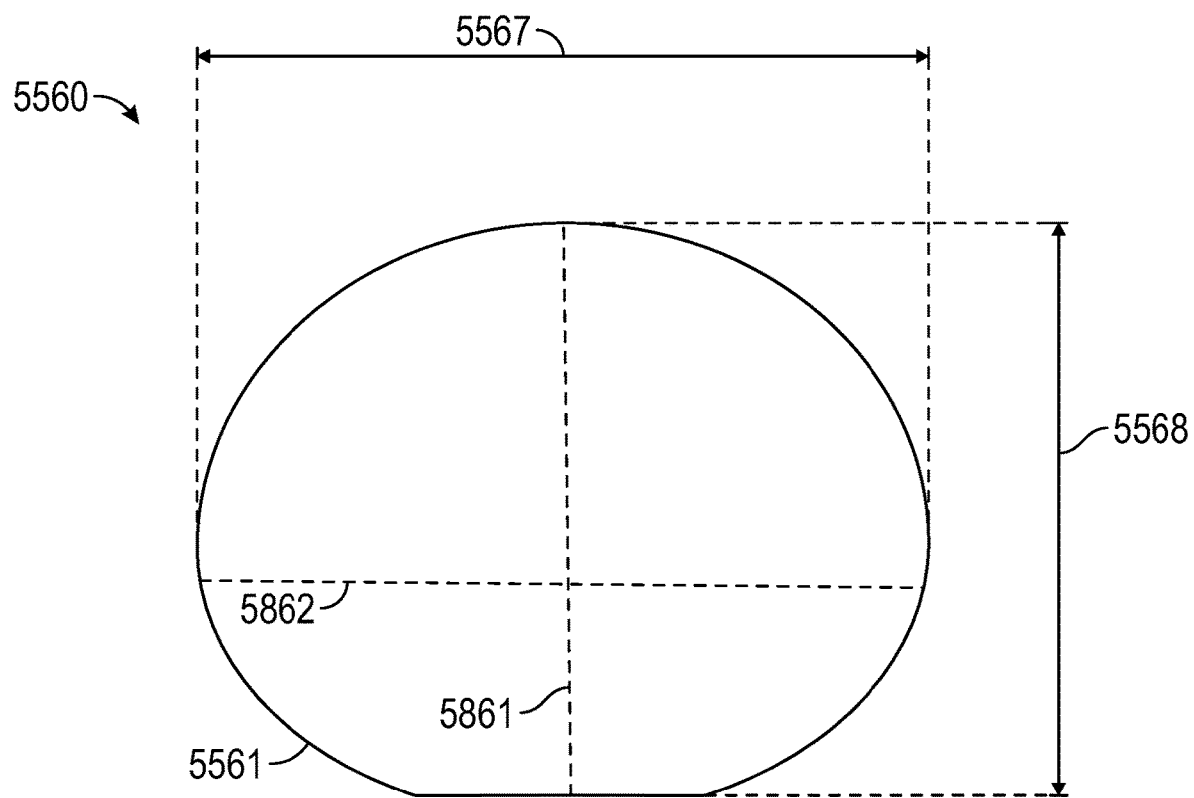
FIG. 25 is a cross-sectional view of a modified form of the bead of the conduit of FIG. 24.

In an alternative embodiment, the cross-sectional shape 2561 of bead 2560 is an elliptical shape having only a single axis of reflective symmetry, as opposed to two axes of symmetry that is commonly present in elliptical shapes. For example, the bead may have a substantially egg-shaped cross-section. In a preferred embodiment, however, the bead may have a flattened elliptical shape. The flattened elliptical shape has a width (in a direction parallel to a longitudinal axis of the conduit) which is greater than its height (in a radial direction). That is, the major axis of the elliptical cross-section is preferably parallel to the longitudinal axis of the conduit. An inwards-facing portion of the bead may be at least partially flattened (i.e. having a relatively greater radius or radii of curvature) with respect to the opposing outwards-facing portion, and in some embodiments may be substantially linear. An example of such a bead is shown in FIGS. 24 and 25, as described in further detail below.

Referring back to FIG. 16, bead 2560 has a cross-sectional width 2567 measured in a direction parallel to longitudinal axis 2571 of conduit 2505, between linear portions 2564, 2567, and a cross-sectional height 2568 measured in a radial direction perpendicular to longitudinal axis 2571 of conduit 2505, between outermost points of semi-oval 2562 and semi-circle 2563.

In a first embodiment, the cross-sectional width 2567 is between about 0.5 mm and 3 mm, preferably between about 0.75 mm and 2 mm, more preferably about 1 mm, and most preferably about 1.1 mm (+0.4 mm, −0.1 mm), i.e. between 1.0 mm and 1.5 mm. The cross-sectional width 2567 should be less than the pitch 2574 so that a space is formed between adjacent coils 2570 of the conduit 2505. In a first embodiment, the cross-sectional height 2568 is between about 0.5 mm and 3 mm, preferably between about 0.75 mm and 2 mm, more preferably about 1 mm and most preferably 1.1 mm (±0.1 mm).

Referring back to FIG. 12, for illustrative purposes, film 2540 will now be discussed in detail. In a first embodiment, during manufacture, film 2540 is extruded in a substantially thin, elongate tape-like form, and subsequently wound around one or more rotating mandrels to form a spiral formation. Preferably, film 2540 is extruded and wound with bead 2560 around one or more rotating mandrels while film 2540 and bead 2560 are in a semi molten state, which enables a permanent bond to be formed between bead 2560 and film 2540. The spiral formation of bead 2560 and the spiral formation of film 2540 are bonded together to form conduit 2505. Conduit 2505 is capable of transporting a flow of pressurized gasses within it. In an alternative embodiment bead 2560 and film 2540 may be bonded in a post manufacturing process by any suitable means to achieve a permanent bond, using an adhesive for example.

In a first embodiment film 2540 and bead 2560 are arranged so that the film 2540 extends between the gaps formed between adjacent coils of the plurality of coils 2570. In this embodiment, the film 2540 is bonded at a first location 2542 on a surface of a first coil 2570 and at a second location 2544 on a surface of a second coil 2570. Film 2540 therefore extends across the gap formed between the first and second coils 2570 and forms a cylindrical conduit 2505 comprising a lumen 2550. As seen in FIG. 17, in a first embodiment, the first bonding location 2542 and second bonding location 2544 are located entirely between internal diameters 2572 and external diameters 2573 of respective first and second adjacent coils 2570a, 2570b of the plurality of coils 2570. The first bonding location 2542 and second bonding location 2544 are spatially discrete such that they are individually separate and distinct.

The film 2540 is preferably draped between adjacent coils 2570 of the bead 2560 as described in further detail below.

It will be appreciated that the film 2540 will have a pitch and angle corresponding to those of the coil, as described above.

In an alternative description, film 2540 and bead 2560 are elongate members spirally wound in an alternating arrangement such that the elongate film 2540 of a first winding is separated from the elongate film 2540 of a second winding by a winding of a coil 2570, of elongate bead 2560. Film 2540 does not overlap itself along the length of conduit 2505. If a series of slices were taken perpendicular to longitudinal axis 2571 along the length of conduit 2505 a distinct separation between windings of film 2540 and bead 2560 would be seen.

In an alternative description, a plurality of coils 2570 are formed from a spiral winding of bead 2560. Each of the plurality of coils 2570 have an inner surface facing radially inwards, and an outer surface facing radially outwards. Film 2540 extends between adjacent coils of the plurality of coils 2570 such that a conduit 2505 is formed. Film 2540 is bonded to locations on adjacent coils of the plurality of coils 2570 such that the inner surface and outer surface of each of the plurality of coils 2570 are exposed, in that at least a portion of each of the inner and outer surfaces of bead 2560 are not covered by film 2540.

In an alternative description, bead 2560 and film 2540 are extruded as elongated continuous members. The continuous elongate bead member 2560 and the continuous elongate film member 2540 are then spirally wound together to form conduit 2505 such that neither the continuous elongate bead member 2560, nor the continuous elongate film member 2540 contact themselves or overlap themselves along conduit 2505.

Common to a first embodiment of the conduit 2505 is the feature of film 2540 extending between adjacent coils of the plurality of coils 2570, or between adjacent windings of bead 2560 such that neither bead 2560, nor the film 2540 overlaps themselves along the length of conduit 2505. Said another way, a section of the spirally wound film 2540 extending between the first and second coils of the bead 2560 does not overlap any sections of the spirally wound film 2540 extending between further adjacent coils of the bead.

It is believed by the applicant that this is to be desirable because the lack of overlapping material will lead to a reduced mass conduit 2505 when comparing against a conduit that has identical dimensions and material otherwise. This reduced mass may lead to a reduced tube drag on the patient interface 1000 and therefore an improved seal between the patient interface 1000 and user may be able to be achieved. The reduced mass may also lead to a reduction in undesirable feelings of restricted movement, impinged comfort and/or pressure on a user caused by the weight of the medical tube 2500 contacting the user's body in use.

In a first embodiment, the weight of the conduit 2505 is less than 100 grams per meter, preferably less than 75 grams per meter, preferably less than 50 grams per meter, and more preferably less than 30 grams per meter.

It is also believed that due to the removal of overlapping sections of film 2540, the overall material needed to manufacture a conduit 2505 is reduced when comparing against a conduit that otherwise has identical dimensions and material. This reduced material usage may lead to a reduced cost overall for medical tube 2500. This reduced cost can be increasingly important in hospital spaces where respiratory components are often single use and are disposed after relatively short periods of use.

Referring again to FIG. 16 for illustrative purposes, film 2540 has a thickness 2548. The thickness 2548 of film 2540 may be selected in response to a desired property of the conduit 2505 such as, but no limited to, elongation, flexibility, tensile strength, conduit mass, or the pressure of gasses to be transported through the conduit 2505.

In a first embodiment, the thickness 2548 of film 2540 is between about 0.05 mm and 1 mm, preferably between about 0.07 mm and 0.75 mm, more preferably about 0.1 mm, and most preferably 0.16 mm (±0.04 mm).

Referring back to FIG. 17 and FIG. 18, the film 2540 when viewed in a side view parallel to longitudinal axis 2505 has a parabolic cross-section between adjacent coils 2570a, 2570b, 2570c of the plurality of coils 2570. The parabolic cross-section has a vertex and the vertex is the furthest radially inward point of the film 2540 such that the film extends radially inwardly between adjacent coils 2570a, 2570b, 2570c of the plurality of coils. This parabolic shape means that the cross-sectional length of film 2540 is greater than the spacing between adjacent coils 2570a, 2570b, 2570c to allow for elongation of the conduit 2505.

Alternatively, the parabolic shape of film 2540 can be described in relation to the inner surface of film 2540, which is facing radially inwardly in respect to conduit 2505, i.e. the surface of film 2540 facing longitudinal axis 2571 of conduit 2505. When viewed in a cross-sectional view parallel to longitudinal axis 2571, as seen in FIG. 17, the inner surface of film 2540 is convex. Additionally, an outer surface of film 2540, which faces radially outwardly from longitudinal axis 2571 of conduit 2505, is concave when viewed in a cross-sectional view parallel to longitudinal axis 2571.

In a first embodiment, the film 2540 comprises an inwardly biased profile. In the context of this invention, an inwardly biased profile can be described with reference to FIGS. 17 and 18 for illustration. In the illustrated embodiment, film 2540 is bonded to bead 2560 at first location 2542 on a first coil 2570a of the plurality of coils 2570 and at a second location 2544 on a second coil 2570b of the plurality of coils 2570. It can be seen that the film 2540 extending between the first and second coil drapes, or is suspended, radially inwardly towards the longitudinal axis 2571 when conduit 2505 is at rest. The amount of drape can be defined by an inward bias distance 2546. The inward bias distance 2546 is the distance between the internal diameter 2572 of the plurality of coils 2570 and the innermost point of the film 2540, or in other words, the point of the film 2540 which has draped radially inwardly the furthest and is located closest to the longitudinal axis 2571 of conduit 2505.

Alternatively, the film 2540 may comprise an outwardly biased profile. In an outwardly biased profile the film 2540 extending between adjacent coils 2570a, 2570b, 2570c of the plurality of coils 2570 drapes, or is suspended, radially outwardly away from the longitudinal axis 2571 of when conduit 2505 is at rest. In this embodiment the cross-sectional view of the film 2540 between adjacent coils 2570a, 2570b, 2570c of the plurality of coils 2570 would comprise a parabolic shape with the vertex being the furthest radially outward point of film 2540. That is, the film 2540 may be convex when viewed from the exterior of the conduit 2505. This may be illustrated by imagining that FIG. 17 shows an upper part of the conduit 2505, rather than a lower part as actually shown.

In a first embodiment, the film 2540 has an inward bias distance 2546 between about 0.05 mm and 0.35 mm, preferably between about 0.1 mm and 0.3 mm and more preferably about 0.2 mm when the conduit is at rest. Alternatively, the film 2540 may have an inward bias distance 2546 between about 0.5 mm and 1.3 mm, preferably between about 0.7 mm and 1.1 mm, and most preferably about 0.9 mm. The inward bias distance 2546 may be selected to achieve a desired property such as, but no limited to, elongation, flexibility, or resistance to flow through conduit 2505.

With reference to FIG. 15, the conduit 2505 has a minimum internal diameter 2552, which is the minimum internal diameter at any point along longitudinal axis 2571 when the conduit is at rest. Because the film 2540 is inwardly biased between the plurality of coils 2570, the minimum internal diameter 2552 of the conduit 2505 is measured between the innermost points of the film 2540 when the conduit 2505 is at rest. It will be appreciated that the actual internal diameter may be reduced if the conduit 2505 is compressed in use, and may be increased if the conduit 2505 is elongated in use, however.

In a first embodiment, conduit 2505 has a minimum internal diameter 2552 of between about 10 mm to 16.8 mm, preferably between about 13 mm to 16 mm, more preferably about 15 mm, and most preferably about 14.0 mm (±0.2 mm).

Conduit 2505 also comprises a length measured in a direction parallel to longitudinal axis 2571 when the conduit is at rest and no external forces are being applied. In a first embodiment, the length is between about 100 mm to 1000 mm, preferably between about 200 mm to 600 mm, and more preferably about 300 mm (±20 mm).

When conduit 2505 is extended in a direction parallel to longitudinal axis 2571 the film 2540 extending between the plurality of coils 2570 is tensioned such that the inward bias distance 2546 of film 2540 is reduced. This can be seen for example in FIG. 19. If the conduit 2505 is further elongated, it will eventually reach a point where the film 2540 is no longer inwardly biased, or no longer drapes between the plurality of coils 2570. Instead, film 2540 is straightened out until it extends substantially directly from first bonding location 2542, to second bonding location 2544, with minimal deviation from the shortest path. The amount of inward bias distance 2546 together with the pitch 2574 of the plurality of coils 2570 provides the conduit 2505 with a first available mechanical elongation. The mechanical elongation is essentially the amount of elongation that can be achieved due to the film 2540 located between the plurality of coils 2570 being straightened out such that the inward bias of the film 2540 is removed.

Should the conduit 2505 be extended in a direction parallel to longitudinal axis 2571 past the available mechanical elongation, the material properties of the film 2540 and bead 2560 will determine the further available elastic elongation that conduit 2505 can undergo without substantial plastic deformation occurring. The total elongation the conduit 2505 can undergo without substantial plastic deformation occurring is the combination of the mechanical elongation and the available elastic elongation.

In a first embodiment, the total elongation of the conduit 2505 without substantial plastic deformation occurring is preferably more than 150% of the resting length, preferably more than 175% of the resting length, preferably more than 200% of the resting length and more preferably more than 210% of the resting length of conduit 2505, where 100% represents the resting length of the conduit.

As well as a desired elongation, the conduit 2505 may also have a desired minimum ultimate tensile strength to ensure that in use the conduit 2505 is not permanently damaged. In a first embodiment, the conduit 2505 may have an ultimate tensile strength when extended at 60 mm per minute of more than 30 Newtons, preferably more than 35

Newtons, and more preferably more than 40 Newtons. Most preferably, the conduit 2505 has a minimum axial tensile strength of 120 Newtons.

Figure 20:
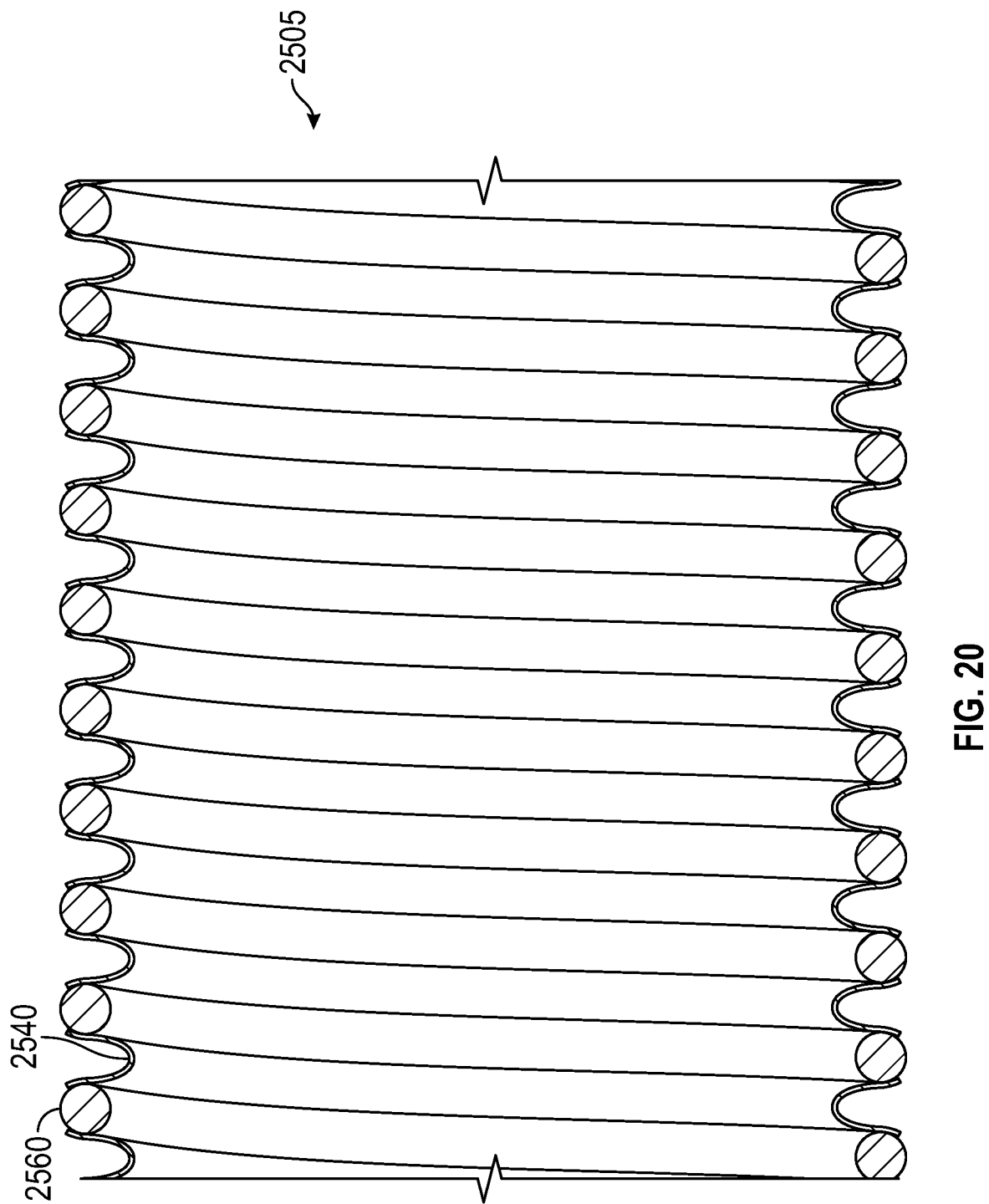
FIG. 20 is a cross-sectional side view of an example section of the conduit of the medical tube of FIG. 3 in a compressed state.

As well as aiding the conduit 2505 in elongation by providing an amount of available mechanical elongation, the inwardly biased profile of film 2540 may be beneficial in allowing the conduit 2505 to be compressed. Referring to FIG. 20 for illustrative purposes, as the conduit 2505 is compressed in a direction parallel to the longitudinal axis 2571 the plurality of coils 2570 are moved closer to one another, or said another way, the pitch is reduced. This movement of the plurality of coils 2570 causes the inward bias distance 2546 of film 2540 to increase, and therefore the film 2540 drapes radially inwards towards the longitudinal axis to a larger extent. The film 2540 being inwardly biased when the conduit 2505 is at rest allows for a predictable deformation of the film 2540 as the conduit 2505 is compressed, this prevents any unexpected buckling and enables the conduit 2505 to be smoothly elongated and compressed.

In a first embodiment, the bead 2560 is preferably formed from a resiliently flexible material, and the film 2540 is preferably formed from a flexible material. In particular, the bead 2560 preferably comprises a thermoplastic polyurethane ("TPU") or a thermoplastic elastomer ("TPE"). In a first embodiment film 2540 preferably comprises a thermoplastic polyurethane ("TPU") or a thermoplastic elastomer ("TPE"). In a first embodiment, first connector 2510, second connector 2520, and swivel 2530 preferably comprise thermoplastics, such as, but not limited to polycarbonate. It is to be appreciated however that any component of medical tube 2500 may comprise any suitable plastic, elastomer, rubber, or other material.

In a first embodiment medical tube 2500 may be manufactured according to the following process. An elongate bead 2560 and an elongate film 2540 are extruded separate from one another. The next step comprises spirally winding the extruded elongate bead 2560 with the extruded film 2540 around one or more mandrels such that the elongate bead 2560 and the elongate film 2540 bond together to form conduit 2505. The elongate bead 2560 and the elongate film 2540 are wound in an alternating arrangement such that the elongate film 2540 of a first winding is separated from the elongate film 2540 of a second winding by the elongate bead 2560. The conduit 2505 is then positioned in a tool so that first connector 2510 and second connector 2520 can be overmoulded to conduit 2505. Swivel connector 2530 is formed separately through injection moulding, and then removably connected to second connector 2520 to form medical tube 2500.

In a first embodiment the medical tube 2500 may have a desired resistance to flow. The resistance to flow being measured when the medical tube 2500 is in a straightened, non-elongated position, such that the tube is at rest. In a first embodiment, with a flow rate of 30 litres per minute, the medical tube 2500 has a resistance to flow of less than 4.5 mmH2O, preferably less than 3 mmH2O, and more preferably less than 1.5 mmH2O. The resistance to flow at a flow rate of 50 litres per minute is preferably less than 5 mmH2O.

Figure 22:
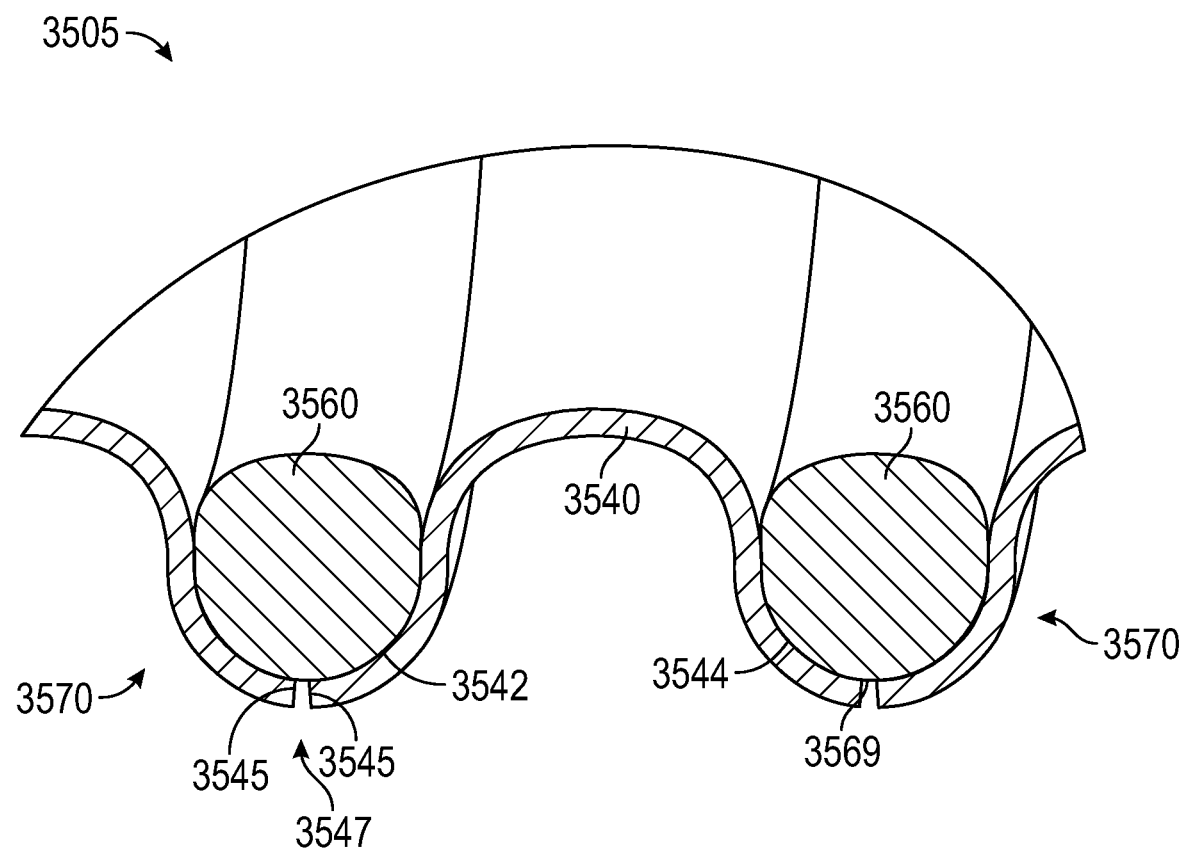
FIG. 22 is a detailed cross-sectional view of a lower part of a conduit according to a second embodiment.

Referring now to FIG. 22, a detailed cross-sectional view of a conduit 3505 according to a second embodiment is shown. Except as described below, conduit 3505 is similar to the conduit 2505 according to the first embodiment. As in the first embodiment, the conduit 3505 comprises alternating spiral-wound bead 3560 and film 3540. The film 3540 is draped between adjacent coils 3570 of bead 3560. The conduit 3505 may form part of a medical tube comprising first and second connectors at opposing ends, and optionally one or more swivel connectors, as described with respect to the medical tube 2500 of the first embodiment.

Conduit 3505 of the second embodiment differs from conduit 2505 of the first embodiment primarily in that the film 3540 extends over a larger proportion of the outer surface 3563 of bead 3560. In particular, in the illustrated embodiment the film 3540, and preferably the first bonding location 3542 and/or second bonding location 3544, extends to a position at or adjacent an apex 3569 or centre of the outer surface of each of the coils 3570. Adjacent windings of the film 3540 do not overlap each other, but may be substantially adjacent each other as shown, forming a small gap 3547 therebetween. Opposing edges 3545 of adjacent windings of the film 3540 are therefore disposed on the coil 3570 in a substantially facing relationship. In alternative embodiments, the adjacent windings of the film 3540 may abut each other, eliminating gap 4547 without overlapping each other, to form a substantially continuous, smooth outer surface of the conduit.

Conduit 3505 retains at least some of the weight- and cost-savings of conduit 2505 of the first embodiment, with respect to a tube in which adjacent windings of a film overlap with each other. Conduit 3505 may have the additional advantage over the preceding embodiment in providing a smoother and/or more visually attractive exterior finish. The smoother exterior finish may provide an improved tactile feel to a user.

Figure 23:
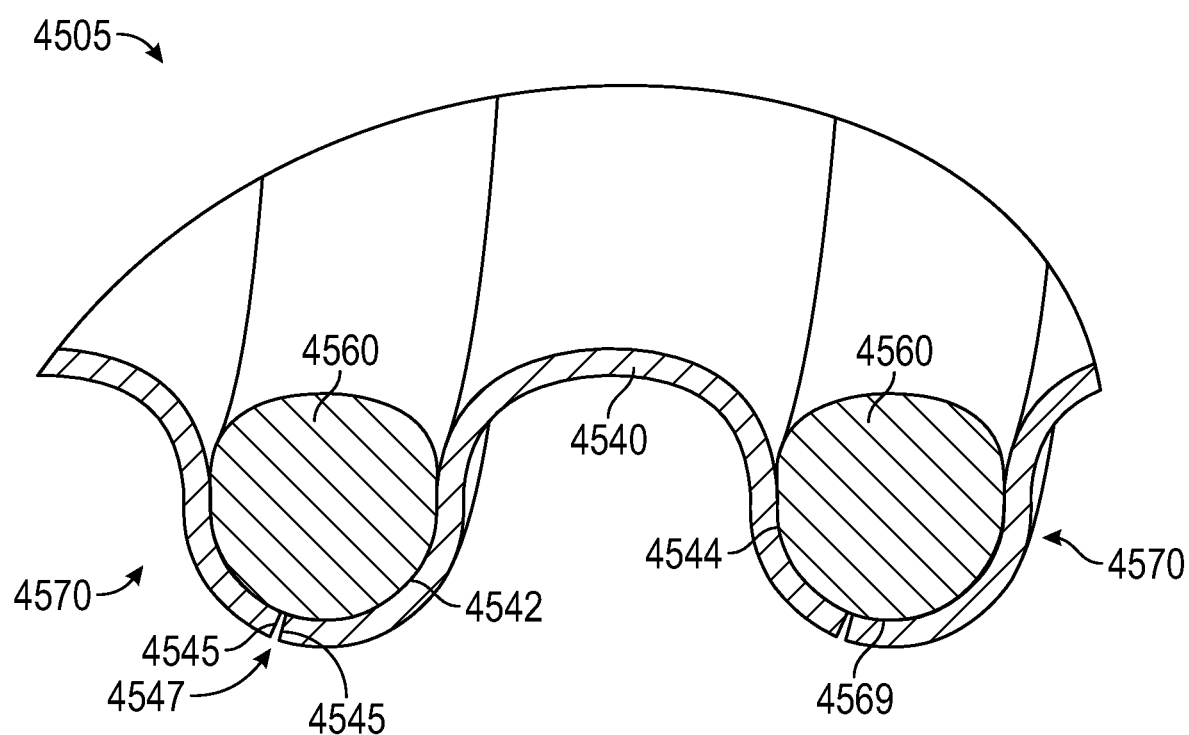
FIG. 23 is a detailed cross-sectional view of a lower part of a conduit according to a third embodiment.

Referring to FIG. 23, a detailed cross-sectional view of a conduit 4505 according to a third embodiment is shown. Except as described below, conduit 4505 is similar to the conduits 2505, 3505 according to the first and second embodiments. As in the first embodiment, the conduit 4505 comprises alternating spiral-wound bead 4560 and film 4540, and adjacent windings of the film 4540 do not overlap. The film 4540 is draped between adjacent coils 4570 of bead 4560. The conduit 4505 may form part of a medical tube comprising first and second connectors at opposing ends, and optionally one or more swivel connectors, as described with respect to the first embodiment.

Like the second embodiment, the film 4540 of this third embodiment extends over substantially all of the outer surface of bead 4560. Unlike the second embodiment, however, the film 4540 is disposed substantially asymmetrically or eccentrically with respect to the coils 4570 of bead 4560. That is, the first and second bonding locations 4542, 4544 may not necessarily be symmetric, and/or may have different bonding surface areas. In other words, the windings of the film 4540 may be translated a short distance with respect to the space between adjacent coils of the bead 4560, in a direction substantially parallel to the longitudinal axis of the conduit 4505.

In particular, the film 4540 in this embodiment extends past the apex 4569 or centre of the outer surface 4563 of one coil 4570 by a predetermined angle or distance, and terminates short of the apex 4569 or centre of the adjacent coil 4570 by a substantially corresponding angle or distance. Thus, adjacent windings of film 4540 do not overlap, but the opposing edges 4545 of adjacent windings of the film 4540 are substantially adjacent and facing each other, offset or off-centre from an apex 4569 or centre of the coil 4570. In the illustrated embodiment, a small gap 4547 is formed between adjacent windings of the film 4540, exposing the outer surface of bead 4560 therebetween. In alternative embodiments, the film may be asymmetrically bonded to the bead while forming a larger gap or spacing between edges of adjacent windings of the film, as in the first embodiment.

In yet other embodiments, the gap may be omitted and opposing edges of adjacent winds of the film may abut each other.

Referring to FIG. 24, a detailed cross-sectional view of a conduit 5505 according to a fourth embodiment is shown. Except as described below, conduit 5505 is similar to the conduits 2505, 3505, 4505 according to the first to third embodiments.

As in the first embodiment, the conduit 5505 comprises alternating spiral-wound bead 5560 and film 5540. The film 5540 is draped between adjacent coils 5570 of bead 5560, without adjacent windings of the film 5540 overlapping. Like the second embodiment, the film 5540 of this fourth embodiment covers substantially all of the outer surface of bead 5560, with only a small portion of the outer surface of bead 5560 remaining exposed by a small gap 5547 between adjacent windings of the film 5540. Like the third embodiment, the film 5540 is asymmetrically bonded to the bead 5560, with the gap 5547 between adjacent windings of the film 5540 being offset from the outer apex 5569 of the bead 5560. The conduit 5505 may form part of a medical tube comprising first and second connectors at opposing ends, and optionally one or more swivel connectors, as described with respect to the first embodiment.

The bead 5560, in cross-section, may be said to have a radial axis 5861 extending in the radial direction, perpendicular to the longitudinal axis of the conduit 5505, and passing through the centroid 5863 of the bead. The bead 5560 may also be said to have a parallel axis 5862 extending in a direction parallel to the longitudinal axis of the conduit 5505, and also passing through the centroid of the bead.

Conduit 5505 differs from the preceding embodiments primarily in that a point of inflection 5549 (in the illustrated embodiment, where the film changes from a convex to a concave shape, or vice versa) of the film 5540, in cross-section, is formed:
  i) radially inwardly of the parallel axis 5862 of the bead 5560;
  ii) radially inwardly of the laterally widest (that is, in a direction parallel to the longitudinal axis of the conduit 5505) point of the bead 5560; and/or
  iii) laterally inwardly (that is, in a direction parallel to the longitudinal axis of the conduit 5505) of the laterally widest point of the bead 5560.

Depending on the cross-section of the bead, the point of inflection may meet only one, any two, or all three of the above criteria. In the illustrated embodiment, however, the point of inflection 5549 meets all three of these criteria. That is, the point of inflection 5549 in conduit 5505 is formed radially inwardly of the parallel axis 5862, radially inwardly of the laterally widest point of the bead 5560, and laterally inwardly from the widest point of the bead 5560.

By contrast, in medical tubes 2500, 3500, 4500 of the preceding embodiments, a point of inflection of each of the films 2540, 3540, 4540 is formed at or adjacent the parallel axis of the beads 2560, 3560, 4560 and/or at the laterally widest point of the beads 2560, 3560, 4560.

Formation of the point of inflection 5549 radially inwardly from the parallel axis 5862 may be achieved by extending the first and second bonding locations 5542, 5544 between the film 5540 and bead 5560 further down the sides of the bead 5560, radially inwardly, beyond the parallel axis 5862 and towards the inner surface of the bead 5560. This results in formation of a corner in the film 5540 at the point of inflection 5549, where the film 5540 suddenly changes from following the converging curvature of a single coil 5570 of bead 5560 to draping towards an adjacent coil 5570 of bead 5560. In other words, adjacent windings of the film 5540 on opposing sides of one coil 5570 converge towards each other before diverging as they drape in opposing directions towards the adjacent coils 5570. The corner may have an angle α of between about 45 degrees and about 135 degrees, preferably between about 80 degrees and about 100 degrees, and more preferably about 90 degrees (±5 degrees). By contrast, in the preceding embodiments the films 2540, 3540, 4540 of the preceding embodiments have an angle of between about 160 degrees and 200 degrees, preferable between about 170 degrees and 190 degrees, and most preferably about 180 degrees at the point of inflection.

Ignoring the gaps 5547 between adjacent windings of the film on the outwards-facing portion of the bead, the wound films 2540, 3540, 4540 of the preceding embodiments may be said to form a substantially sinusoidal shape in cross-section, whereas the film 5540 of the present embodiment forms an Omega-shape (Ω) about each of the coils 5570.

The film 5540 in this embodiment may conform to the bead 5560 through an angle of between 210 and 330 degrees, preferably between 240 and 300 degrees, and more preferably about 270 degrees. These angles refer to the angle between the points of inflection 5549 or corners of the film 5540 on opposing sides of the bead 5560, ignoring the gap 5547. At least part of an inwards-facing portion of the bead 5560 remains exposed between the points of inflection 5549 of adjacent windings of the film 5540 on opposing sides of the bead 5560. That is, the film 5540 does not fully encapsulate the bead 5560, even if the gap 5547 on the outside surface of the bead were omitted.

Alternatively, or additionally, the film may be bonded to between 55% and 95%, preferably between 65% and 85%, and more preferably around 75% of the circumferential surface of the bead 5560, in cross-section. By contrast, it can be seen that the film 2560 of the first embodiment, as illustrated, is bonded to less than 120 degrees or 33% of the circumferential surface of bead 2560.

The increased bonding area provided by conduit 5505 may permit a conduit of higher tensile strength. Alternatively, or additionally, it may allow for the angle or curve of the drape of the film between adjacent coils 5570 to be further tailored.

Referring to FIG. 25, it can be seen that conduit 5505 also differs from the preceding embodiments in that the bead 5560 has a different cross-sectional shape 5561. The cross-sectional shape 5561 in this embodiment comprises a substantially elliptical shape, and more particularly a flattened elliptical shape. The term "elliptical" in this context is used in the loose sense of "generally elliptical," as opposed to the formal mathematical definition of an ellipse.

The flattened elliptical shape has a width 5567 (in a direction parallel to a longitudinal axis of the conduit) which is greater than its height 5568 (in a radial direction). That is, the major axis of the elliptical cross-section is preferably parallel to the longitudinal axis of the conduit. An inwards-facing portion of the bead 5560 may be flattened (i.e. having a greater radius or radii of curvature) with respect to the opposing outer surface of the bead 5560, and in some embodiments may be substantially linear, as shown in FIG. 25.

Although various specific embodiments have been described above, it is to be understood that various modifications or improvements may be made thereto. Unless otherwise apparent from the context, features or elements of each of the embodiments, and/or disclosed variations thereof, may be substituted for the corresponding element of any other embodiment. By way of non-limiting example:

The conduits 3505, 4505, 5505 of the second to third embodiments may be substituted for the conduit 2505 of the first embodiment, and in particular combined with one or more of the first connector 2510, second connector 2520 and swivel connector 2530, or equivalents thereof, to form a medical tube. Any of the disclosed conduits 2505, 3505, 4505, 5505 may also be substituted for the conduit of medical tube 1500 to provide an apparatus comprising a medical tube fluidly coupled with patient interface 1000.

Each of the conduits 3505, 4505, 5505 may comprise a plurality of beads, as described as an alternative with respect to the conduit 2505 of the first embodiment.

The coils 3570, 4570, 5570 of each of conduits 3505, 4505, 5505 may be non-circular, and in particular elliptical, as described as an alternative with respect to the conduit 2505 of the first embodiment.

An internal diameter and/or external diameter of the coils 3570, 4570, 5570 of each of the conduits 3505, 4505, 5505 of the second to fourth embodiments may vary along the length of the conduit, as described as an alternative with respect to the conduit 2505 of the first embodiment.

A pitch of each of the conduits 3505, 4505, 5505 of the second to fourth embodiments may vary along the length of the conduit, as described as an alternative with respect to the conduit 2505 of the first embodiment.

A coil angle of each of the conduits 3505, 4505, 5505 of the second to fourth embodiments may vary along the length of the conduit, as described as an alternative with respect to the conduit 2505 of the first embodiment.

The film 3540, 4540, 5540 may be co-extruded with bead 3560, 4560, 5560 in the conduits 3505, 4505, 5505 of the second to fourth embodiments, as described with respect to the conduit 2505 of the first embodiment, or may be bonded in a post manufacturing process as described in the alternative.

The inwardly-biased film 3540, 4540, 5540 of each of the second to fourth embodiments may alternatively be outwardly-biased as described as an alternative with respect to the conduit 2505 of the first embodiment.

The film 2540 of conduit 2505 of the first embodiment may be asymmetrically bonded to the bead 2560 as described with reference to the conduit 4505 of the third embodiment.

The flattened elliptical cross-sectional shape 5561 of bead 5560 the fourth embodiment of conduit 5505 may be substituted for the D-shaped cross-sectional shapes of the beads 2560, 3560, 4560 of conduits 2505, 3505, 4505 of the first to third embodiments.

The film 3540, 4540, 5540 of conduits 3505, 4505, 5505 may alternatively be bonded to bead 3560, 4560, 5560 of the second to fourth embodiments with a larger gap, as shown with respect to the conduit 2505 of the first embodiment, for example.

The relatively large gap formed between adjacent windings of film 2540 of conduit 2505 of the first embodiment may be combined with the asymmetric bonding of film 4540, 5540 of the third and fourth embodiments.

In some embodiments, such as a modified form of the conduit 5505 of the fourth embodiment, adjacent windings of the film may overlap and/or be bonded to each other at or adjacent the outside surface of the bead.

Any one of conduits 2500, 3500, 4500, 5500 may be used as the conduit of medical tube 1500 for use in combination with the patient interface 1000 of FIG. 2, or any of the patient interfaces described in the alternative.

The terms "comprise", "comprises" or "comprising" and the like in this specification and claims, are to be interpreted non exhaustively as specifying the presence of the stated features, steps or components referred to, but not to preclude the presence or addition of one or more other feature, step, component or group thereof.

Any one of the terms: 'including' or 'which includes' or 'that includes' as used herein is also an open term that also means including at least the elements/features that follow the term, but not excluding others. Thus, 'including' is synonymous with and means 'comprising'.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavor to which this specification relates.

What we claim is:

1. A medical tube comprising a conduit, the conduit formed from a spirally wound bead and a spirally wound film, wherein:

the spirally wound bead forms a plurality of successive coils, each of the plurality of successive coils having an internal diameter and an external diameter; and the spirally wound film extends between adjacent coils of the bead wherein the film is bonded at a first location on a surface of a first coil of the bead and at a second location on a surface of a second coil of the bead, wherein the first coil is adjacent to the second coil, wherein the first location and the second location are located between the internal diameters and external diameters on opposed sides of respective first and second adjacent coils such that the spirally wound film extending between the first and second adjacent coils of the bead does not overlap any sections of the spirally wound film extending between further adjacent coils of the bead;

wherein the spirally wound film is inwardly biased between the first coil and the second coil of the bead such that the spirally wound film extends inwards from the internal diameter by an inward bias distance towards a longitudinal axis of the conduit when the medical tube is at rest and such that an inner surface of the spirally wound film facing the longitudinal axis is convex and an outer surface of the spirally wound film facing radially outwardly from the longitudinal axis is concave when the medical tube is at rest, the inward bias distance being a radial distance between the internal diameter of one or both of the first coil and the second coil and a point of the film located closest to the longitudinal axis when the medical tube is at rest, wherein the inward bias distance is between about 0.1 mm and about 0.3 mm when the medical tube is at rest.

2. The medical tube of claim 1, wherein the internal diameter and the external diameter of each of the plurality of successive coils are substantially uniform when the medical tube is at rest.

3. The medical tube of claim 1, wherein the spirally wound bead comprises a thermoplastic polyurethane or a thermoplastic elastomer.

4. The medical tube of claim 1, wherein the spirally wound film comprises a thermoplastic polyurethane or a thermoplastic elastomer.

5. The medical tube claim 1 tube of claim 1, wherein a length of the conduit is between about 100 mm to 1000 mm.

6. The medical tube of claim 5, wherein the length of the conduit is approximately 300 mm.

7. The medical tube of claim 1, wherein the plurality of successive coils comprises a pitch, and the pitch is between about 1.5 mm to 3.5 mm when the medical tube is at rest.

8. The medical tube of claim 1, wherein the conduit has a minimum internal diameter between about 10 mm to 16.8 mm when the medical tube is at rest.

9. The medical tube of claim 1, wherein the plurality of successive coils have an internal diameter between about 10 mm to 17 mm when the medical tube is at rest.

10. The medical tube of claim 1, wherein the plurality of successive coils have an external diameter between about 11 mm to 18 mm.

11. The medical tube of claim 1, wherein the plurality of successive coils have an external diameter between about 16 mm to 20 mm.

12. The medical tube of claim 1, wherein the spirally wound bead has a cross-sectional shape that is substantially D-shaped.

13. The medical tube of claim 1, wherein the spirally wound bead has a cross-sectional shape that is substantially elliptical.

14. The medical tube of claim 1, wherein the spirally wound bead has a cross-sectional width of approximately 1 mm in a direction parallel to a longitudinal axis of the medical tube and a cross-sectional height of approximately 1 mm in a direction perpendicular to the longitudinal axis of the medical tube.

15. The medical tube of claim 1, wherein the spirally wound film has a thickness of about 0.05 mm to 1 mm.

16. The medical tube of claim 1, wherein the conduit has a ratio of thickness of the spirally wound bead to the spirally wound film of about 1:0.05 to about 1:1.

17. The medical tube of claim 1, wherein the medical tube has a resistance to flow of less than or equal to 1.5 mm/$H_2O$ when in a straightened non-extended position at 30 L/Min.

18. The medical tube of claim 1, wherein the plurality of successive coils have a coil angle between about 3 degrees and 6 degrees.

19. The medical tube of claim 1, wherein the conduit has a strength in tension greater than 40 N when extended at 60 mm/min.

20. The medical tube of claim 1, wherein the conduit can elongate from 100% of its resting length up to at least 210% of its resting length without substantial plastic deformation occurring.

21. The medical tube of claim 1, wherein the conduit has a weight between about 20 grams per meter and 100 grams per meter.

22. The medical tube of claim 1, wherein the first and/or second locations comprise a portion of the bead adjacent the external diameter of the bead.

23. The medical tube of claim 1, wherein opposing edges of adjacent windings of the film are disposed on the bead substantially adjacent each other and/or in a substantially facing relationship.

24. The medical tube of claim 1, wherein the first location and the second location are asymmetric.

25. The medical tube of claim 1, wherein the film, in cross-section, forms an angle of between about 170 degrees and about 190 degrees.

26. The medical tube of claim 1, wherein the film, in cross-section, forms a substantially sinusoidal shape about the bead.

27. The medical tube of claim 1, wherein the film, in cross-section, forms an angle of between about 45 degrees and about 135 degrees.

28. The medical tube of claim 1, wherein the first location and/or the second location, in cross-section, extends inwardly beyond a parallel axis and/or a widest point of the bead.

29. The medical tube of claim 1, wherein the film forms an Omega (Ω)-shape about each of the coils.

30. The medical tube of claim 1, wherein the medical tube further comprises a first connector at a first end configured for connection with a patient interface, and a second connector at a second end configured for connection with a respiratory device.

31. An apparatus for the delivery of positive pressure respiratory therapy comprising:

the medical tube of claim 1, and a patient interface.

32. The medical tube of claim 1, wherein the concave outer surface of the spirally wound film defines a portion of an outermost surface of the conduit.

33. The medical tube of claim 1, wherein a wall thickness of the spirally wound film defines a wall thickness of the conduit between the adjacent coils of the bead and between the first location and the second location.

* * * * *